(12) United States Patent
Fujikawa

(10) Patent No.: US 10,964,284 B2
(45) Date of Patent: Mar. 30, 2021

(54) ELECTRONIC COMPONENT BOARD AND DISPLAY PANEL

(71) Applicant: SHARP KABUSHIKI KAISHA, Sakai (JP)

(72) Inventor: Yohsuke Fujikawa, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 16/557,206

(22) Filed: Aug. 30, 2019

(65) Prior Publication Data
US 2020/0074955 A1    Mar. 5, 2020

Related U.S. Application Data

(60) Provisional application No. 62/727,448, filed on Sep. 5, 2018.

(51) Int. Cl.
G09G 3/36      (2006.01)
G02F 1/1362    (2006.01)
G02F 1/1333    (2006.01)

(52) U.S. Cl.
CPC ..... *G09G 3/3688* (2013.01); *G02F 1/133308* (2013.01); *G02F 1/136286* (2013.01)

(58) Field of Classification Search
CPC .......... G09G 3/3688; G02F 1/133308
See application file for complete search history.

(56) References Cited

U.S. PATENT DOCUMENTS

| 10,199,398 B2* | 2/2019 | Chen .................... H01L 27/0255 |
| 2010/0118250 A1* | 5/2010 | Fujikawa .............. G02F 1/1345 349/139 |
| 2012/0146972 A1* | 6/2012 | Fujikawa ............ G02F 1/13452 345/206 |
| 2015/0022770 A1 | 1/2015 | Yamaguchi et al. |

FOREIGN PATENT DOCUMENTS

WO    2013/140760 A1    9/2013

\* cited by examiner

*Primary Examiner* — Kent W Chang
*Assistant Examiner* — Scott D Au
(74) *Attorney, Agent, or Firm* — ScienBiziP, P.C.

(57) ABSTRACT

An electronic component board includes a signal line area in which signal lines extend in parallel to each other and a frame area that surrounds the signal line area. In the frame area, terminals, connection lines that connect the signal lines and the terminals, and circuits that are arranged along a portion of an outline of the signal line area and on respective line paths of the connection lines. The connection lines are routed such that an entire outline thereof is formed in a fan shape so as to be narrowed from the signal lines toward the terminals. The circuits include a first circuit and a second circuit. The second circuit has a small X-dimension in an arrangement direction of the circuits and a large Y-dimension in a perpendicular direction.

13 Claims, 18 Drawing Sheets

ELECTRONIC COMPONENT BOARD AND DISPLAY PANEL

CROSS REFERENCE TO RELATED APPLICATION

This application claims priority from U.S. Provisional Patent Application No. 62/727,448 filed on Sep. 5, 2018. The entire contents of the priority application are incorporated herein by reference.

TECHNICAL FIELD

The technology described in this specification relates to an electronic component board and a display panel.

BACKGROUND ART

There has been known a display panel that includes a pair of substrates and an electric optical substance such as liquid crystals. The substrates are disposed opposite each other and the electric optical substance is sealed between the substrates. One of the substrates is a component board and is opposite a counter substrate, which is another one of the substrates. An opposite surface of the component board includes a matrix area MA, and gate lines (row lines), source lines (column lines), switching components and pixel electrodes are disposed on the matrix area MA. The gate lines extend in parallel to each other and the source lines extend perpendicular to the gate lines. The switching components and the pixel electrodes are disposed at intersections of the gate lines and the source lines. A driving circuit is arranged in a frame area FA that surrounds the matrix area MA. Electric signals are sent from the circuit to the electrodes within the matrix area MA such that a voltage is applied to the electric optical substance and the amount of exit light is changed and an image is displayed on the matrix area MA. Such a display panel is practically used as a display section of a liquid crystal display device, particularly active matrix type liquid crystal display device, and such a display panel is widely used in a portable device or a television device.

Recently, such a display panel for a portable device that includes a large image display area and a small frame width has been preferably used. Terminals that receive electric signals from an external device are mounted on an edge section of a component board, and wiring through which the electric signals are sent and driving circuit are locally mounted on the edge section. As a result, the frame area FA needs a relatively large area in a terminal-side frame area FAT. Therefore, a technology for reducing the frame width of the terminal-side frame area FAT has been particularly demanded. For example, WO 2013/140760 discloses a technology as follows. Unit circuits are arrayed in a line in the terminal-side frame area FAT and an arrangement pitch of the unit circuits is greater in an outer section than in an inner section thereof. Accordingly, the lines that are disposed between the unit circuit and the terminals disposed outside the circuit can be arranged at an angle such that the frame width of the terminal-side frame area FAT becomes smaller.

It has been known that an area that is necessary for arranging the circuits has qualitative characteristics as described below. A dimension of the area in one direction is inversely proportional to a dimension thereof in a direction perpendicular to the one direction. Namely, if a dimension of the circuit in the arrangement direction is increased, a necessary dimension of the circuit in a perpendicular direction that is perpendicular to the arrangement direction is reduced, and if the dimension of the circuit in the arrangement direction is decreased, the necessary dimension of the circuit in the perpendicular direction is increased.

In the matrix substrate described in WO 2013/140760, the dimension of the unit circuit in the perpendicular direction (in other words, a frame width direction of the terminal-side frame area FAT) is same in all of the unit circuits. Namely, the perpendicular dimension of the entire circuit that includes multiple unit circuits is equal to the perpendicular dimension of the unit circuits that are arranged at small pitches, and the perpendicular dimension is relatively large. Accordingly, in the active matrix substrate described in WO 2013/140760, the frame width dimension of the circuit is kept large and therefore, there has been limitation to reduce the frame width dimension of the terminal-side frame area FAT.

SUMMARY

The present technology was made in view of the above circumstances. An object is to arrange a circuit and connection lines on an electronic component board efficiently.

(1) An embodiment of the technology described in the specification is an electronic component board including a signal line area where signal lines extend and a frame area surrounding the signal line area. In the frame area, terminals through which an external signal is input to the signal lines, connection lines connecting the signal lines and the terminals, and circuits are disposed, and the circuits are disposed between the signal line area and the terminals and arranged on line paths of the connection lines and arranged along a portion of an outline of the signal line area. The connection lines are routed such that an entire outline thereof is formed in a fan shape so as to be narrowed from the signal lines toward the terminals. The circuits include a first circuit and a second circuit, and the first circuit has an arrangement dimension in an arrangement direction of the circuits greater than that of the second circuit, and has a perpendicular dimension in a perpendicular direction perpendicular to the arrangement direction smaller than that of the second circuit.

(2) An embodiment of technology described in the specification is an electronic component board that includes a configuration, in addition to the configuration described in (1), in which the first circuits and one of the terminals that are connected with one of the connection lines are disposed with a displacement in the arrangement direction that is greater than a displacement of the second circuit and another one of the terminals that are connected with another one of the connection lines, and the one connection line connecting the one terminal and the first circuit is inclined at an angle θ1 with respect to the arrangement direction and the other connection line connecting the other terminal and the second circuit is inclined at an angle θ2 with respect to the arrangement direction and the angle θ1 and the angle θ2 satisfy |tan θ1|<|tan θ2|.

(3) An embodiment of technology described in the specification is an electronic component board that includes a configuration, in addition to the configuration described in (1) or (2), in which the first circuit includes a first circuit component and the second circuit includes a second circuit component, and the first circuit component differs from the second circuit component in at least one of a shape, a direction, a number, and an arrangement direction if multiple circuit components are included.

(4) An embodiment of technology described in the specification is an electronic component board that includes a configuration, in addition to the configuration described in any one of (1) to (3) in which the first circuit and the second circuit are test circuits that supply a test signal to the signal lines.

(5) An embodiment of technology described in the specification is an electronic component board that includes a configuration, in addition to the configuration described in any one of (1) to (3), in which the first circuit and the second circuit are crossing sections of the signal lines and an auxiliary line that is used as a detour line when the signal lines are disconnected.

(6) An embodiment of technology described in the specification is an electronic component board that includes a configuration, in addition to the configuration described in any one of (1) to (3), in which the first circuit and the second circuit are protection circuits.

(7) An embodiment of technology described in the specification is an electronic component board that includes a configuration, in addition to the configuration described in any one of (1) to (6), in which the signal lines include column lines or row lines, the column lines and the row lines are arranged in a matrix, pixel electrodes are disposed corresponding to intersections of the column lines and the row lines in the signal line area, and the signal line area displays an image.

(8) An embodiment of technology described in the specification is a display panel that includes the electronic component board described in any one of (1) to (7).

According to the present technology, a circuit and connection lines are arranged on an electronic component board efficiently so that a display panel including a reduced frame width is obtained while satisfying a demanded property such as high resolution.

DETAILED DESCRIPTION

First Embodiment

Figure 1:
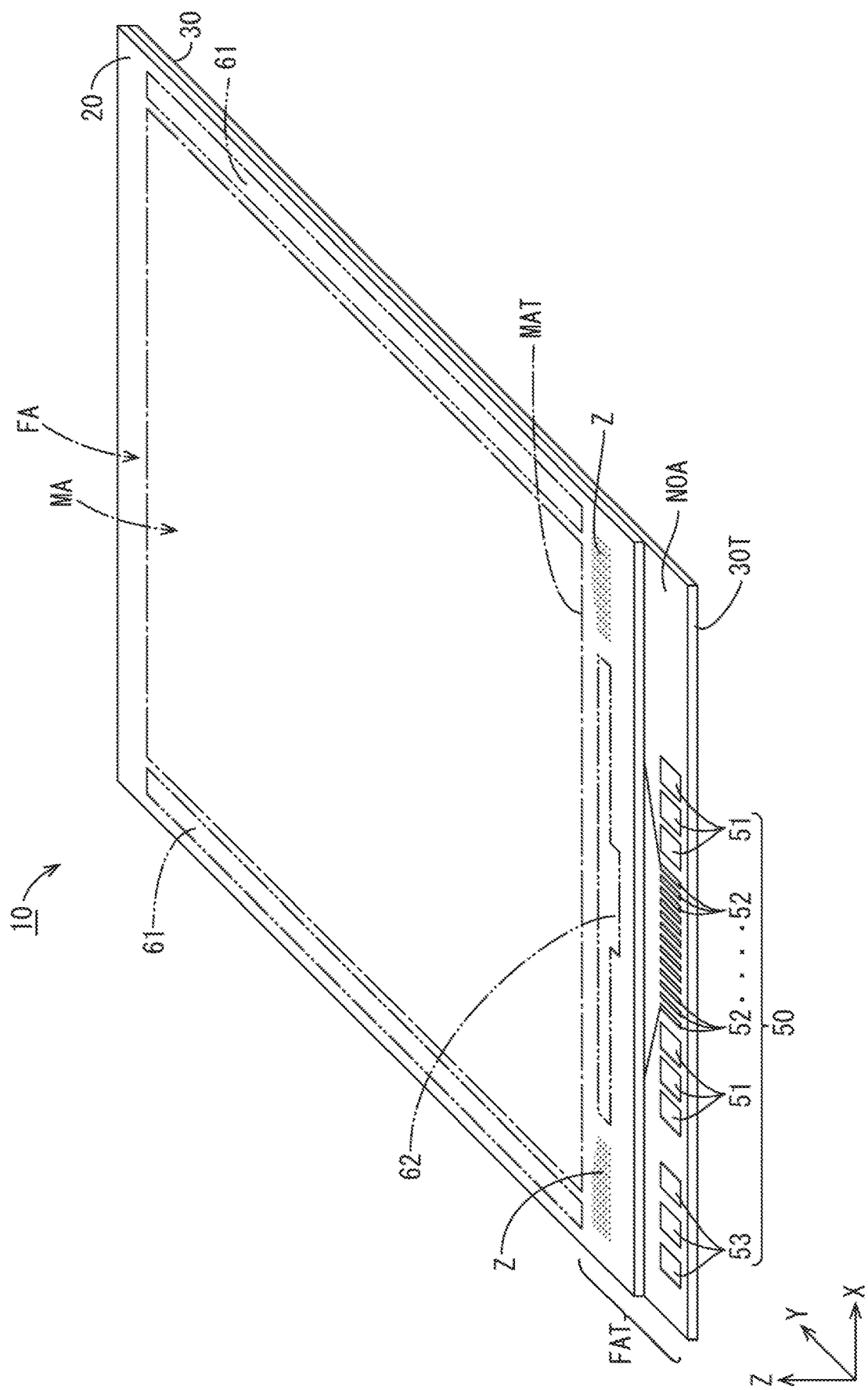
FIG. 1 is a perspective view illustrating a general configuration of a liquid crystal panel according to a first embodiment.

A first embodiment will be described with reference to FIGS. 1 to 8. In the first embodiment section, a liquid crystal panel (one example of a display panel) 10 will be described as an example. X-axis, Y-axis and Z-axis may be present in the drawings and each of the axial directions represents a direction represented in each drawing. In the following, regarding each component and each area, a dimension along the X-axis may be represented by an X-dimension, and a dimension along the Y-axis may be represented by a Y-dimension. A front-upper side on a sheet in each of FIGS. 1, 9 and 13 and an upper side in FIG. 2 correspond to a front side or a front surface side (a rear-lower side on a sheet in each of FIGS. 1, 9 and 13 and a lower side in FIG. 2 correspond to a back side or a back surface side). An upper side in FIGS. 4, 10, and 14 corresponds to an upper side (a lower side in FIGS. 4, 10, and 14 corresponds to a lower side), and a left side in the same drawings corresponds to a left side (a right side in the drawings corresponds to a right side). One of the same components is provided with a reference number and a rest of them may not be provided with the reference number.

A general configuration of the liquid crystal panel 10 will be described with reference to FIG. 1. The liquid crystal panel 10 according to the first embodiment may be used for a display panel of a display device that is included in various kinds of electronic devices such as mobile phones (including smartphones), notebook computers (including tablet computers), wearable terminals (including smart watches), hand-held terminals (including electronic books and PDAs), and portable video game players. In the first embodiment, the liquid crystal panel 10 has a display size in a range between some inches to ten and some inches and is a display panel in a size that is classified as a small or a small-to-medium. However, the screen size is not particularly limited and the technology described herein may be applied to a display panel having a screen size of dozens of inches or more and being classified as a medium or a large (extra-large).

As illustrated in FIG. 1, the liquid crystal panel 10 according to the first embodiment has a vertically-elongated quadrangular overall shape (a quadrangular plate shape). A short-side direction matches the X-axis direction and a long-side direction matches the Y-axis direction. The liquid crystal panel 10, which has a substantially plate shape, has front and rear plate surfaces and a front surface is a display surface on which an image is displayed. A displayed image can be seen from the front side of the liquid crystal panel 10. A backlight unit, which is not illustrated, is disposed on a back surface side of the liquid crystal panel 10 and light is supplied to the liquid crystal panel 10 from the back surface side.

Figure 2:
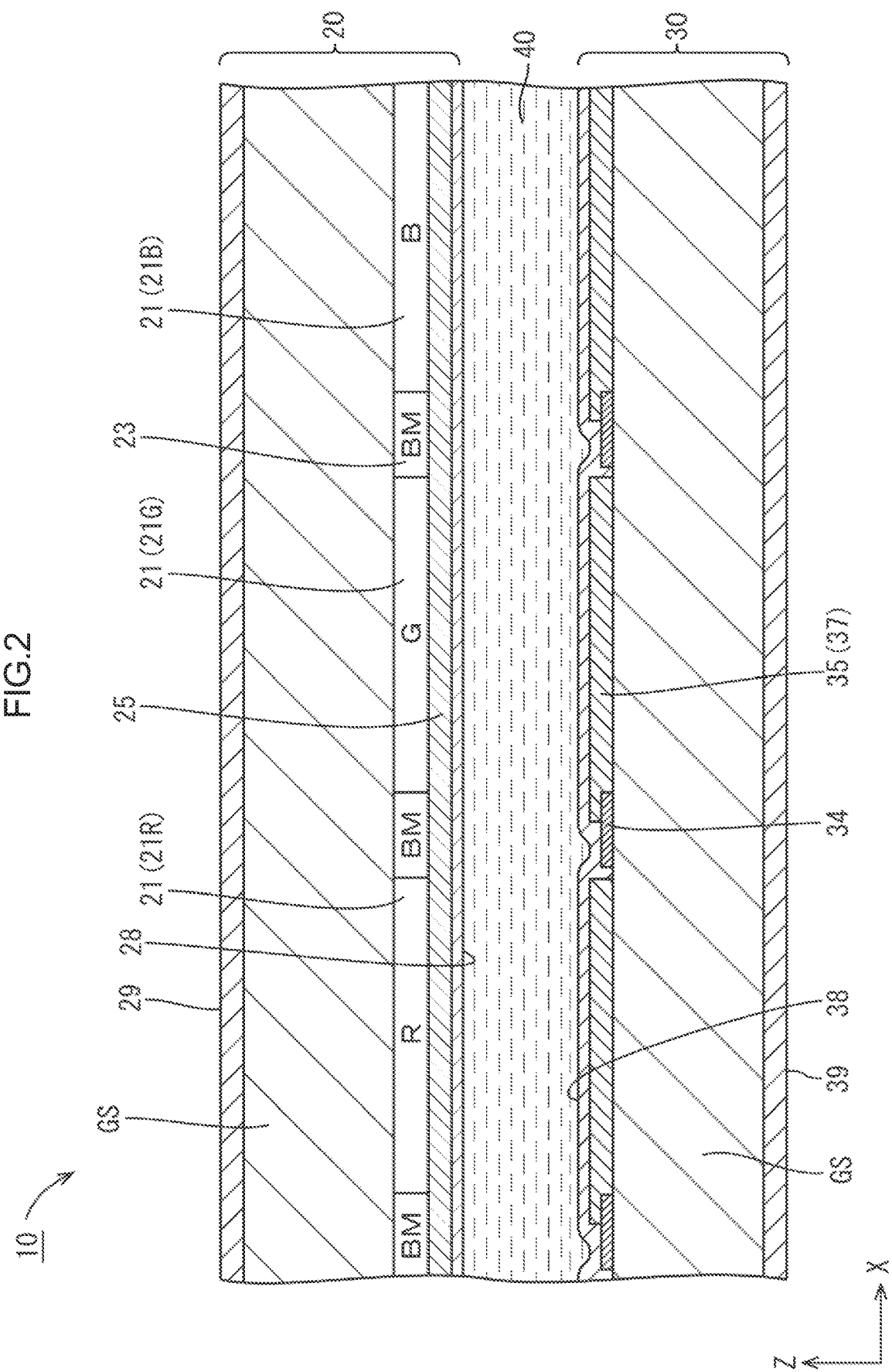
FIG. 2 is a schematic view illustrating a general cross-sectional configuration of a matrix area MA of a liquid crystal panel.

The liquid crystal panel 10 is a so-called liquid crystal cell that has a known general configuration and includes a pair of rectangular plate-shaped substrates 20, 30 that are bonded to each other while the plate surfaces thereof being opposite each other. The substrates 20, 30 are bonded to each other with sealing material made of epoxy resin, which is not illustrated, while having a predetermined distance therebetween. As illustrated in FIG. 2, a space between the substrates 20, 30 is filled with liquid crystal material, which changes its alignment according to supply of an electric signal, and a liquid crystal layer 40 is formed. Known liquid crystal material can be used. In the first embodiment, the liquid crystal panel 10 operates in a vertical alignment (VA) mode in which negative type nematic liquid crystal material is used. In the VA mode, the liquid crystal material is aligned substantially vertical to plate surfaces of the substrates 20, 30 in an initial state (non-energized state) in which no voltage is applied between the substrates 20, 30. The liquid crystal material is injected into the space between the substrates 20, 30 with a vacuum injection method or a one drop filling method. With the vacuum injection method, after the substrates 20, 30 are bonded to each other, the space between the substrates 20, 30 is depressurized and the liquid crystal material is injected into the space. With the one drop filling method, when the substrates 20, 30 are bonded to each other, the liquid crystal material is dropped on one of the substrates and the space is filled with the material.

Out of the pair of substrates 20, 30 illustrated in FIGS. 1 and 2, the substrate that is disposed on the back surface side is an electronic component board (a matrix substrate, an array substrate, a device substrate) 30 and the substrate that is disposed on the front side is a counter substrate 20. The counter substrate 20 may be referred to as a color filter substrate (a CF substrate) or a common electrode substrate according to a configuration thereof. As illustrated in FIG. 1, the electronic component board 30 has a dimension in the Y-axis direction that is greater than that of the counter substrate 20 and has a dimension in the X-axis direction that is substantially same as that of the counter substrate 20. The substrates 20, 30 are disposed opposite each other such that short sides thereof on upper edges are aligned with each other. Accordingly, the electronic component board 30 includes a substrate non-overlapping area NOA in a section thereof close to the lower short side. The counter substrate 20 does not overlap the substrate non-overlapping area NOA. An external connection terminal section 50 is disposed on the substrate non-overlapping area NOA and includes terminals through which electric signals are input from an external device and output signals are output. The external connection terminal section 50 includes row control terminals 51, column control terminals 52, and test terminals 53, which will be described later.

As illustrated in FIG. 1, a matrix area (one example of a signal line area) MA is defined in a middle section of the plate surface of the liquid crystal panel 10. In the middle section, the electronic component board 30 and the counter substrate 20 are overlapped with each other. The matrix area MA is an area that is surrounded by a chain line in FIG. 1 and has a rectangular shape that is slightly smaller than the plate surface of the counter substrate 20. On the plate surface of the liquid crystal panel 10, a frame-shaped area (a square frame shape) that surrounds the matrix area MA is a frame area FA. The matrix area MA where the pixels PX are formed (refer FIG. 3) corresponds to a display area (an active area) on which an image is displayed, and the frame area FA where no pixel PX is formed corresponds to a non-display area (a non-active area) on which no image is displayed. As illustrated in FIG. 1, the frame area FA includes a substrate non-overlapping area NOA where the external connection terminal section 50 is formed, and the lower frame area FA is referred to as a terminal-side frame area FAT. Further, in the following, a lower short side of an outline of the matrix area. MA is referred to as a terminal side MAT and a lower short side edge of the electronic component board. 30 is referred to as a terminal-side edge 30T. In the first embodiment, the terminal side MAT and the terminal-side edge 30T extend along the X-axis and the terminal-side frame area. FAT is disposed between the terminal side MAT and the terminal-side edge 30T with respect to the Y-axis direction.

As illustrated in FIG. 2, each of the substrates 20, 30 includes a substantially transparent light transmissive substrate GS that has insulation properties and through which visible light passes. A glass substrate, a silicon substrate, and a plastic substrate that has heat resistant properties can be used as the light transmissive substrate GS. Polarizing plates 29, 39 are attached to most outer surfaces (opposite from the liquid crystal layer) of the substrates 20, 30, respectively. Various kinds of films are stacked on an inner surface of each of the light transmissive substrates GS (on a liquid crystal layer 40 side, an opposing surface) with a known film forming technology such as a photolithography method and various components are formed. Alignment films 28, 38 are formed on most inner surfaces of the substrates 20, 30, respectively. The most inner surfaces are contacted with the liquid crystal layer. After the alignment films are subjected to rubbing and an alignment treatment that is necessary for the optical alignment, the substrates are bonded to each other such that the alignment films are opposite each other.

The configuration on an inner surface side (a liquid crystal layer side, an opposing surface side opposing the counter substrate 20) of the electronic component board 30 will be described with reference to FIG. 2 and FIG. 3. In each drawing, various kinds of components are illustrated simply and some portions thereof may be not illustrated in the drawing. Particularly, in FIG. 2, many of the layered films are not illustrated. In the first embodiment, a so-called active matrix substrate that includes a substrate and thin film transistors (TFTs) are disposed on the substrate is described as an example. On the inner surface side of the electronic component board 30, the films are stacked in a predetermined pattern in the following sequence from the lowest layer (a light transmissive substrate GS side): a first metal film (a gate metal film), a gate insulation film, a semiconductor film, a second metal film (a source metal film), an organic insulation film, a transparent electrode film 37, and an alignment film 38. The films included in the electronic component board 30 are not limited thereto but may include other films as appropriate in addition to the above films or instead of the above films. Some of the above films may not be included.

Figure 3:
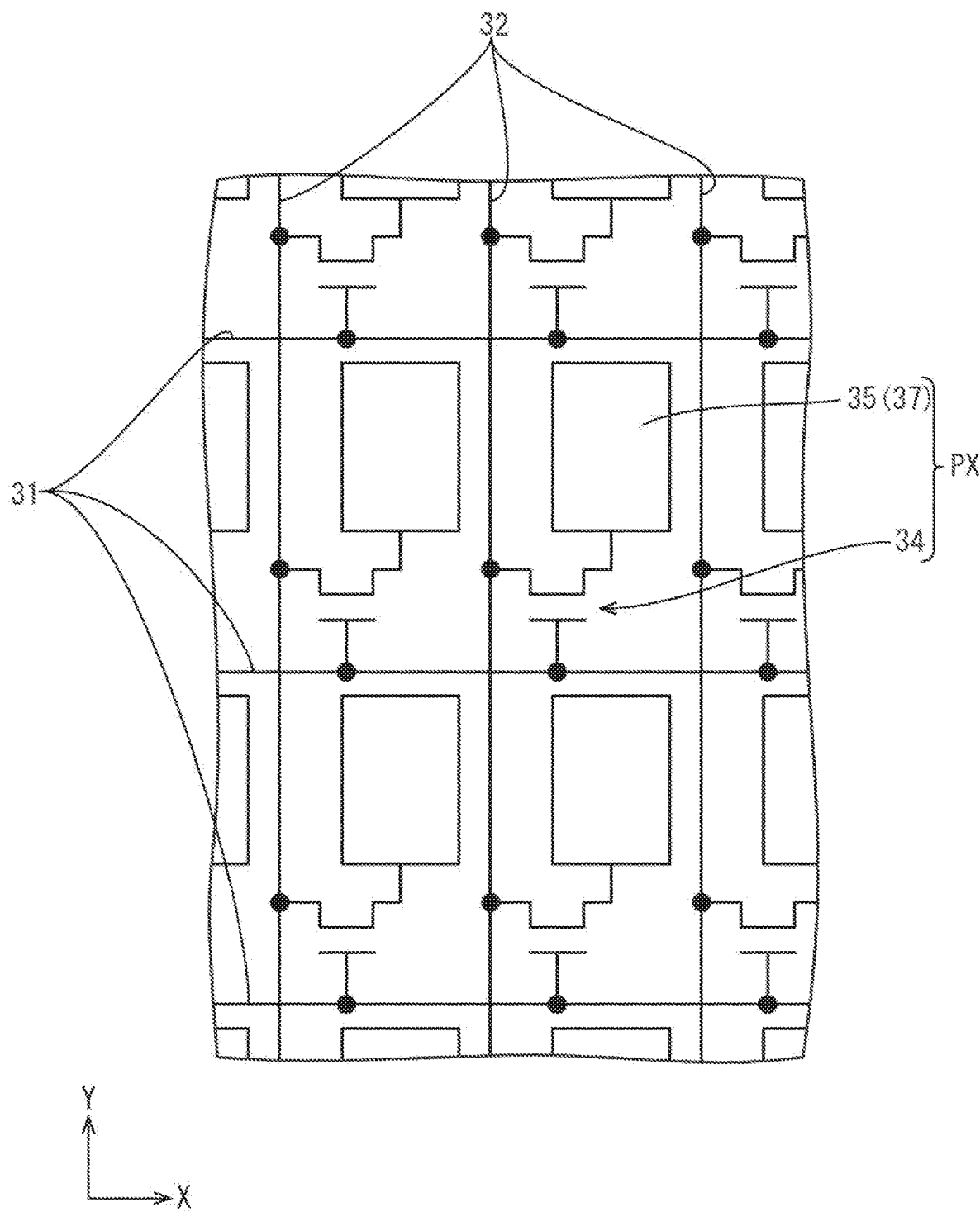
FIG. 3 is a schematic view illustrating a planar configuration of the matrix area MA of an electronic component board such as wiring.

As illustrated in FIGS. 2 and 3, on the inner surface side of the electronic component board 30 in the matrix area MA, TFTs 34, which are switching components (display components), and pixel electrodes 35 are arrayed in a matrix (in rows and columns) along the row direction (the X-axis direction) and the column direction (the Y-axis direction). As illustrated in FIG. 3, gate lines (gate bus lines, row lines, row control lines, scanning lines) 31 extend in parallel to each other and source lines (source bus lines, column lines, column control lines, data lines, examples of signal lines) 32 extend in parallel to each other. The gate lines 31 and the source lines 32 are disposed to surround each of the TFTs 34 and each of the pixel electrodes 35.

Among the above components, the TFT 34 illustrated in FIG. 2 and FIG. 3 includes a gate electrode section, a source electrode section, a drain electrode section, and a channel section that connects the source electrode section and the drain electrode section and allows electrons to move between the electrode sections (are not specifically illustrated). In the first embodiment, a so-called invert staggered type TFT is described as an example of the TFT 34. The semiconductor film a portion of which is the channel section is included in an upper layer side of the first metal film a portion of which is the gate electrode section. The second metal film portions of which are the source electrode section and the drain electrode section is included in an upper layer side of the semiconductor film. The switching components are not particularly limited and the TFTs that have a known configuration can be used. For example, a staggered type (Coplanar type) TFT may be used. The staggered type TFT includes a semiconductor film in a lowest layer and includes a gate electrode in a layer upper than the semiconductor film via an insulator. The first metal film and the second metal film may be a single-layer film formed of one of metal materials, such as copper, titanium, aluminum, molybdenum, and tungsten or a multi-layer film or an alloy formed of different kinds of the metal materials. The gate insulator is formed of silicon nitride ($SiN_x$) or silicon oxide ($SiO_2$). The semiconductor film includes a silicon thin film formed of an amorphous silicon or a low-temperature polycrystalline silicon, or an oxide thin film including indium (In), gallium (Ga), and zinc (Zn), which are one kind of an oxide semiconductor. As illustrated in FIG. 3, the TFT 34 is connected to the gate line 31 and the source line 32 and also connected to a pixel electrode 35, which will be described later, through a contact hole (not illustrated) that is formed in an organic insulator.

As illustrated in FIG. 3, the pixel electrode 35 has a vertically-long rectangular (quadrangular) plan view shape. The pixel electrode 35 is formed of a transparent electrode film 37 that is disposed in a layer upper than the second metal film via the organic insulator having a large thickness. The organic insulator is made of acrylic resin (for example, PMMA), which is an organic material, and functions as a planarizing film that planarizes unevenness of a film that is disposed in a layer lower than the organic insulator. The transparent electrode film 37 is made of transparent electrode material such as indium tin oxide (ITO) or indium zinc oxide (IZO). The pixel electrode 36 and the TFT 34 connected thereto configure a pixel PX.

Figure 4:
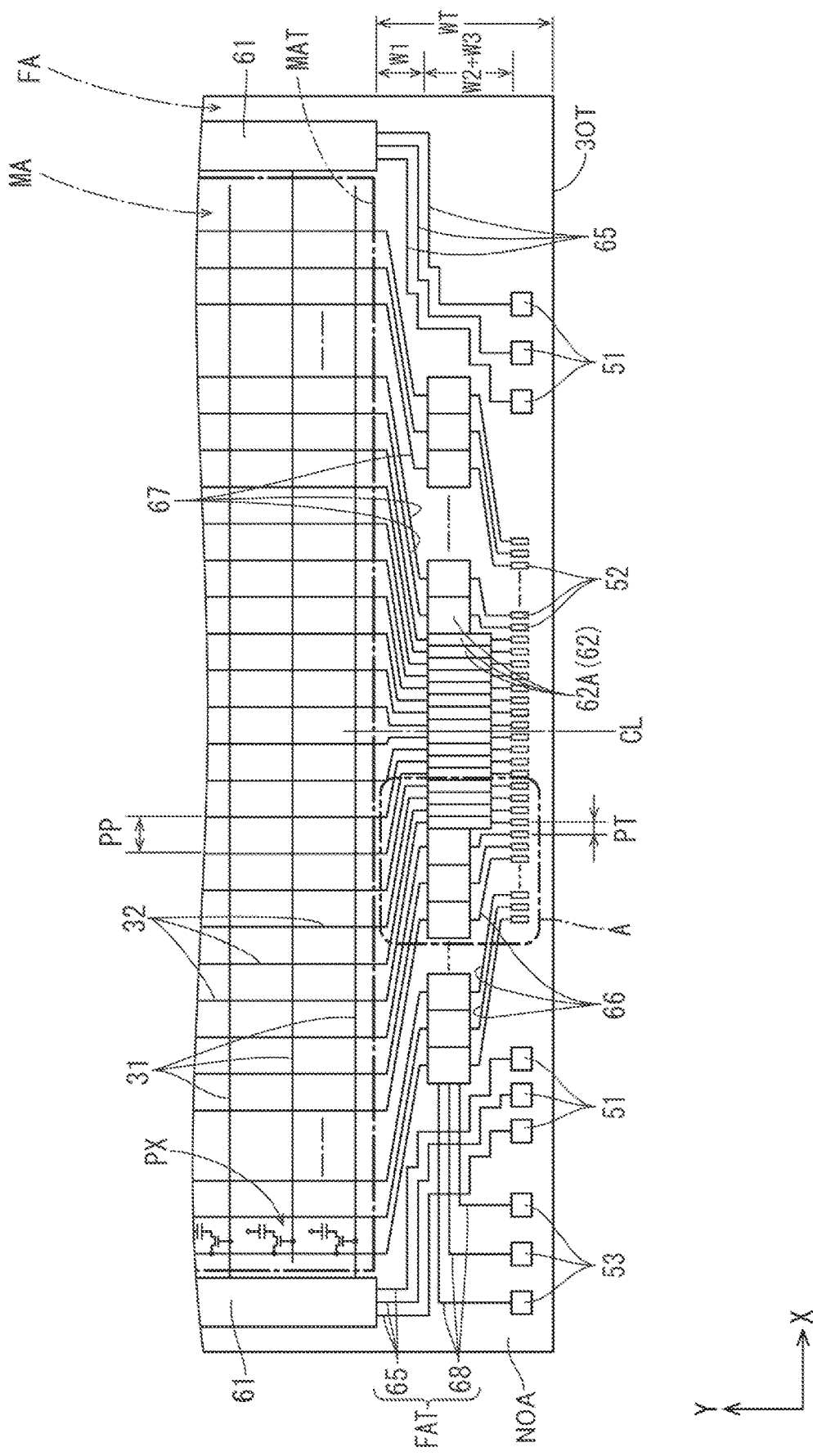
FIG. 4 is a schematic view illustrating a planar configuration of a terminal-side frame area FAT of the electronic component board and therearound.

The gate lines 31 and the source lines 32 illustrated in FIGS. 3 and 4 are sections of the first metal film and sections of the second metal film, respectively, and the gate insulator is disposed therebetween at intersections of the gate lines 31 and the source lines 32. The gate lines 31 and the gate electrodes are sections of the first metal film that is disposed in a relatively lower layer (on the light transmissive substrate GS side). The source lines 32, the source electrodes, and the drain electrodes are sections of the second metal film that is disposed in a relatively upper layer than the first metal film via the gate insulator. In the first embodiment, the source lines 32 are arranged at certain line intervals PP within the matrix area MA. The number of the source liens 32 is N. Although not illustrated in FIG. 3, capacitance lines extending along the gate lines 31 and crossing the pixel electrodes 35 may be included. The capacitance lines are sections of the first metal film. The gate lines 31 extend in parallel to (in the X-axis direction) the terminal side MAT of the matrix area MA and the source lines 32 extend vertically to the terminal side MAT (in the Y-axis direction) within the matrix area MA.

Next, a configuration on an inner surface side (a liquid crystal layer side, an opposing surface side that is opposite the electronic component board 30) of the counter substrate 20 will be described with reference to FIG. 2. In the first embodiment, the counter substrate 20 including a counter electrode (a common electrode) 25 will be described. In a liquid crystal panel that includes a counter substrate where no counter electrode (a common electrode) is disposed, the pixel electrode and the counter electrode (the common electrode) are disposed on an electronic component board.

As illustrated in FIG. 2, the counter substrate 20 includes a color filter 21 including color portions 21R, 21G, 21B of three colors that exhibit red (R), green (G), and blue (B), respectively. Although a planar configuration of the counter substrate 20 is not illustrated, the color portions 21R, 21G, 21B of the color filter 21 are arranged along a row direction (the X-axis direction) and a column direction (the Y-axis direction), namely, in rows and columns (a matrix) so as to overlap the pixel electrodes 35 of the electronic component board 30, respectively, in a plan view. An inter-pixel light blocking section 23 may be formed between the color portions 21R, 21G, 21B of the color filter for reducing color mixture. The inter-pixel light blocking section 23 is a light blocking film (BM, black matrix) that blocks light from transmitting therethrough and is formed in a matrix. The inter-pixel light blocking section 23 overlaps the gate lines 31 and the source lines 32 in a plan view. The counter electrode 25 is disposed in a solid manner on an inner surface of the color filter 21 and the inter-pixel light blocking section 23. The counter electrode 25 is opposite the pixel electrodes 35 on the electronic component board 30 side. The counter electrode 25 is formed of a transparent electrode film that is made of transparent electrode material such as indium tin oxide (ITO) or indium zinc oxide (IZO). The counter electrode 25 is disposed in a solid manner over a substantially entire area of the matrix area MA on the inner surface of the counter substrate 20. Although not illustrated in FIG. 2, spacers may be disposed on a surface of the counter electrode 25 so as to keep a thickness (a cell gap) of the liquid crystal layer 40.

As described earlier, the pixel electrode 35 disposed on the electronic component board 30 and the TFT 34 connected thereto configure the pixel PX as illustrated in FIGS. 3 and 4. The pixel PX exhibits a color corresponding to the color portion 21R, 21G, 21B that is opposite the pixel electrode 35 included therein. Thus, in the first embodiment, a red pixel exhibiting red, a green pixel exhibiting green, and a blue pixel exhibiting blue configure one display unit. The pixels are arranged in the row direction (the X-axis direction) and the column direction (the Y-axis direction), namely, in rows and columns (in a matrix), repeatedly. Among the pixels PX arranged in rows and columns, the pixels PX that are arranged along the row direction are connected to the same gate line 31 and configure a pixel row, and the pixels PX that are arranged along the column direction are connected to the same source line 32 and configure a pixel column. Thus, a pixel array is formed. The TFTs 34 of the pixels PX included in the pixel row are provided with scanning signals via the same gate line 31. The TFTs 34 of the pixels PX included in the pixel column are provided with image signals (data signals, video signals) via the same source line 32. Among the pixels PX included in the pixel row, adjacent pixels PX exhibit different colors. Among the pixels PX included in the pixel column, adjacent pixels PX exhibit a same color. The counter electrode 25 is maintained at a constant reference potential. If a potential is supplied to the pixel electrode 35, a potential difference is created between the pixel electrode 35 and the counter electrode 25. An alignment state of the liquid crystal, layer 40 is changed according to the potential difference, and accordingly, the polarization state of transmission light is changed and the amount of transmission light that transmits through the liquid crystal panel 10 can be controlled independently for every pixel PX. Thus, a predetermined color image is displayed on the matrix area MA.

Next, a configuration disposed on the frame area FA of the electronic component board 30 will be described with reference to FIGS. 1 and 4. As illustrated in FIGS. 1 and 4, the external connection terminal section 50 is formed on the substrate non-overlapping area NOA of the terminal-side frame area FAT. Typically, a driver (a driving part) and a signal transmission board (a transmission part), which are not illustrated, are mounted on a surface of the external connection terminal section 50. The driver and the signal transmission board are connected to the external connection terminal section 50 electrically and mechanically via an anisotropic conductive film, which is not illustrated. Although mounting parts are not illustrated, for example, the driver is an LSI chip including a driving circuit therein and is configured to perform a process according to input signals supplied from an external signal supply source (not illustrated) and generate output signals and output the output signals to the matrix area of the liquid crystal panel 10.

As illustrated FIG. 4, the external connection terminal section 50 is disposed on the rectangular substrate non-overlapping area NOA of the electronic component board. 30 in the first embodiment and disposed along the terminal-side edge 30T of the electronic component board 30. The external connection terminal section 50 includes row control terminals 51, column control terminals 52, and test terminals 53. Signals for controlling craving of the gate lines 31 are output from the row control terminals 51. Signals for controlling driving of the source lines 32 are output from the column control terminals 52. Signals for testing the source lines 32 are output from the test terminals 53. As illustrated in FIG. 4, all of the terminals are arranged in a line along the X-axis direction in the first embodiment. The terminals are arranged in respective blocks for every function. The column control terminals 52 are arranged along a middle portion of the terminal-side edge 30T at certain arrangement intervals PT. The number (N) of column control terminals 52 is same as that of the source lines 32. In this specification, the arrangement interval is referred to as an interval between adjacent terminals and adjacent circuits at a middle portion thereof or an interval between the adjacent terminals at a connection lane extending position thereof. In the first embodiment, all of the terminals included in the external connection terminal section 50 are arranged in a line; however, it is not limited thereto. For example, the column control terminals 52, the number of which is N, may be arranged in a zig-zag manner.

As illustrated in FIGS. 1 and 4, the electronic component board 30 includes a row control circuit (a gate driver driving circuit) 61 and a column control circuit (a source driver driving circuit) 62 in the frame area FA. The row control circuit 61 is connected to the gate lines 31 in the matrix area MA and the column control circuit 62 is connected to the source lines 32. Each of the row control circuit 61 and the column control circuit 62 includes a control circuit that is configured to control supply of output signals to the TFTs 34 in the matrix area MA. Each circuit included in the row control circuit 61 and the column control circuit 62 is formed in a monolithic manner on the electronic component board 30, and each circuit includes the semiconductor film, which is formed of an amorphous silicon, a low-temperature polycrystalline silicon, or an oxide semiconductor, the first metal film, and the second metal film as a base similar to the TFTs 34. Each circuit can be formed on the electronic component board 30 with the known photolithography method with patterning at the same time of forming the gate electrode section, the source electrode section, the drain electrode section, and the channel section included in the TFT 34, the gate lines 31, and the source lines 32 with patterning the metal film, various kinds of insulators, and the semiconductor film in a process of producing the liquid crystal panel (the electronic component board 30).

As illustrated in FIGS. 1 and 4, the row control circuit 61 is disposed next to right and left long sides of an outline of the matrix area MA and is formed in a vertically-long substantially rectangular area extending along the Y-axis direction. In the first embodiment, two row control circuits 61 are disposed on the right and left sides, respectively; however, the row control circuit may be disposed on one of the two sides. The row control circuit 61 is configured to control driving of the gate lines 31 in the matrix area MA and includes a scanning circuit that is configured to supply a scanning signal included in the output signal from the row control terminal 51 to each gate line 31 at a certain timing and scan each gate line 31 sequentially. Specifically, the scanning circuit of the row control circuit 61 is configured to scan the gate lines 31 as follows. The scanning circuit is configured to supply a control signal (scanning signal) from the driving circuit to the gate lines 31, which are arranged in parallel to the X-axis direction in the matrix area MA, sequentially from the gate line 31 at one end position to the gate line 31 at another end position with respect to the Y-axis direction. The scanning circuit included in the row control circuit 61 includes a buffer circuit that is connected to the gate lines 31 and amplifies the scanning signal and outputs the amplified scanning signal to the gate lines 31. The row control circuit 61 may include an auxiliary circuit such as a level shifter circuit or an ESD protection circuit for protection from ESD.

As illustrated in FIGS. 1 and 4, the column control circuit 62 is disposed next to the lower terminal side MAT of the matrix area MA and is formed in a laterally-long substantially rectangular area extending along the X-axis direction. Namely, circuits included in the column control circuit 62 are arranged between the terminal side MAT and the external connection terminal section 50 in the terminal-side frame area FAT so that edges of the circuits opposite the terminal side MAT (on an upper side) are aligned in a straight line along the terminal side MAT, which is a portion of the outline of the matrix area MA. As a result, the circuits are arrayed in parallel to the column control terminals 52.

In the first embodiment, as illustrated in FIG. 4, the column control circuit 62 includes a test circuit (one example of a circuit) 62A for testing. The test circuit 62A is connected to the test terminal 53 via a test connection line 68, which will be described later. For example, in the electronic component board 30 having no driver thereon, a test signal is output from the test terminal 53 to drive the pixels PX in the matrix area MA and display a test pattern so that non-defective determination and analysis of the liquid crystal panel 10 are performed. The test circuit 62A includes a component that is exclusive for testing and is allowed to supply current to each of the N source lines 32 only at the timing of testing without using the column control terminals 52. In other words, the test circuit 62A is configured to drive the component exclusive for testing included in the test circuit 62A in response to the output signal transmitted from the test terminal 53 via the test connection line 68 and supply a certain electric signal to the source lines 32 to perform a test. After the liquid crystal display device including the liquid crystal panel 10 is shipped as a product, the component exclusive for testing included in the test circuit 62A is always in an off state via the test connection line 68 such that an unnecessary image is not displayed on the matrix area of the liquid crystal panel 10. A detailed arrangement structure of the test circuits 62A will be described later.

On the terminal-side frame area FAT of the electronic component board 30, in addition to the external connection terminal section 50 and the circuits 61, 62, which are described earlier, connection lines such as row connection lines 65, column connection outer lines 66, column connection inner lines 67, and the test connection lines 68 are routed. The row connection line 65 connects the row control terminal 51 and the row control circuit 61. The column connection outer line 66 connects the column control terminal 52 and the circuit of the column control circuit ((for example, the test circuit 62A). The column connection inner line 67 connects the circuit of the column control circuit 62 and the source line 32. The test connection line 68 connects the test terminal 53 and the test circuit 62A.

Next, layout of the terminals, the circuits, the connection lines in the terminal-side frame area FAT will be described with reference to FIG. 4. In the first embodiment, the external connection terminals except for the test terminals 53 (the row control terminals 51 and the column control terminals 52), the row control circuits 61, the column control circuit 62, and the connection lines except for the test connection lines 68 (the row connection lines 65, the column connection outer lines 66, the column connection inner lines 67) are arranged symmetrically with respect to the Y-axis in a middle of the electronic component board 30, as illustrated in FIG. 4, namely, linearly symmetrical with respect to a center line CL along the Y-axis direction on the electronic component board 30.

As illustrated in FIG. 4, the row connection lines 65 and power source lines are routed in areas 2 that are present on right and left sides of the column control circuit 62 and illustrated with shading in FIG. 1. The areas Z are corner sections of a substrate overlapping area of the terminal-side frame area FAT overlapping the substrates 20, 30. The row connection lines 65 extend from the respective row control terminals 51 to the row control circuits 61 disposed on the left and right sides of the matrix area MA. The power source lines are used for driving the row control circuits 61. Particularly in the first embodiment, the test connection lines 68 are also routed in the area Z on the left side in FIG. 4. Therefore, in the area Z, the various kinds of lines and the components disposed along the terminal side MAT of the matrix area MA are easily contacted with each other. To arrange the components effectively so as not to be contacted with each other, the column control circuit 62 may not be preferably disposed in the area Z and an X-axis dimension of the column control circuit 62 is preferably smaller than a length of the terminal side MAT of the matrix area MA.

In the first embodiment, as illustrated in FIG. 4, the column control circuit 62 including the test circuits 62A is configured such that the dimension of the test circuit 62A in the arrangement direction or the X-dimension of the test circuit 62A is smaller than the length of the terminal side MAT. Therefore, the column connection inner lines 67 are routed such that an outline of an entire routing area thereof is a fan-like shape and is narrowed from the terminal side MAT toward the column control circuit 62. On the substrate non-overlapping area NOA, not only the column control terminals 52 but also the row control terminals 51 and the test terminals 53 are arranged in a line along the terminal-side edge 30T. Therefore, the dimension of a disposed area of the column control terminals 52 in the arrangement direction thereof is smaller than the dimension of the column control circuit 62 in the arrangement direction. Thus, the column connection outer lines 66 are routed such that an outline of an entire routing area thereof is a fan-like shape and is narrowed from the column control circuit 62 toward the column control terminals 52.

Figure 5:
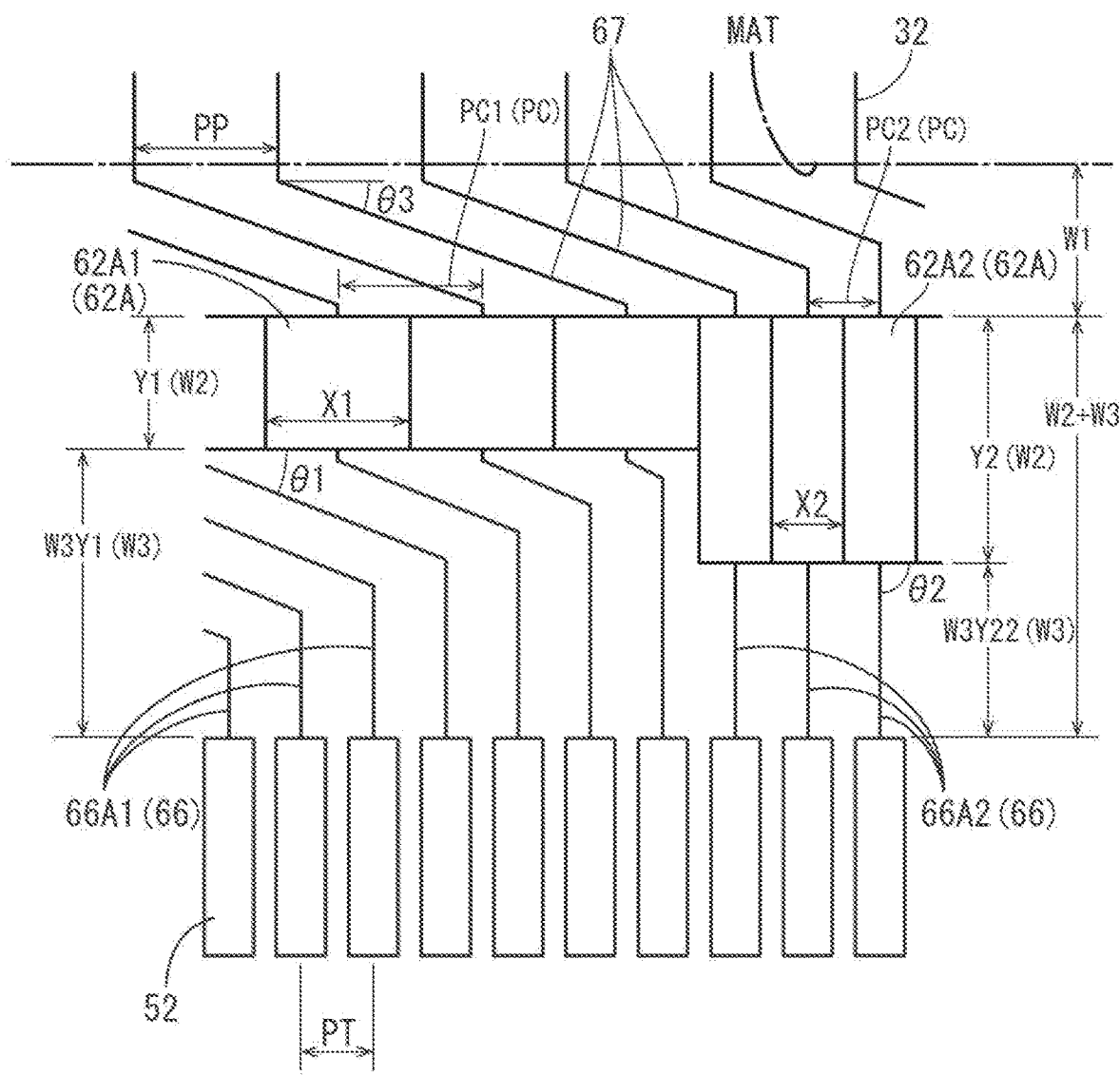
FIG. 5 is a partially enlarged view of an area A (a portion of the terminal-side frame area FAT of the electronic component board) in FIG. 4.

As illustrated in FIG. 4, the test circuits 62A included in the column control circuit 62 in the first embodiment are varied both in the X-dimension in the arrangement direction (the X-axis direction, the row direction) and in the Y-dimension in a perpendicular direction (the Y-axis direction, the column direction) that is perpendicular to the arrangement direction. Specifically, as illustrated in FIG. 5 illustrating a magnified area A in FIG. 4, the test circuits 62A include a first circuit 62A1 and a second circuit 62A2. The first circuit 62A1 has a relatively large X-dimension X1 and the second circuit 62A2 has a relatively small X-dimension X2. As illustrated in FIG. 4, the test circuits 62A in the first embodiment are arranged such that the first circuits 62A1 and 62A2 are arranged along the X-axis direction without having a space therebetween. Therefore, an arrangement pitch PC of the test circuits 62A is equal to the X-dimension thereof. Namely, the arrangement pitch PC1 of the first circuits 62A1 illustrated in FIG. 5 is equal to the X-dimension of the first circuit 62A1 (PC1=X1) and the arrangement pitch PC2 of the second circuits 62A2 is equal to the X-dimension X2 of the second circuit 62A2 (PC2=X2).

Figure 7:
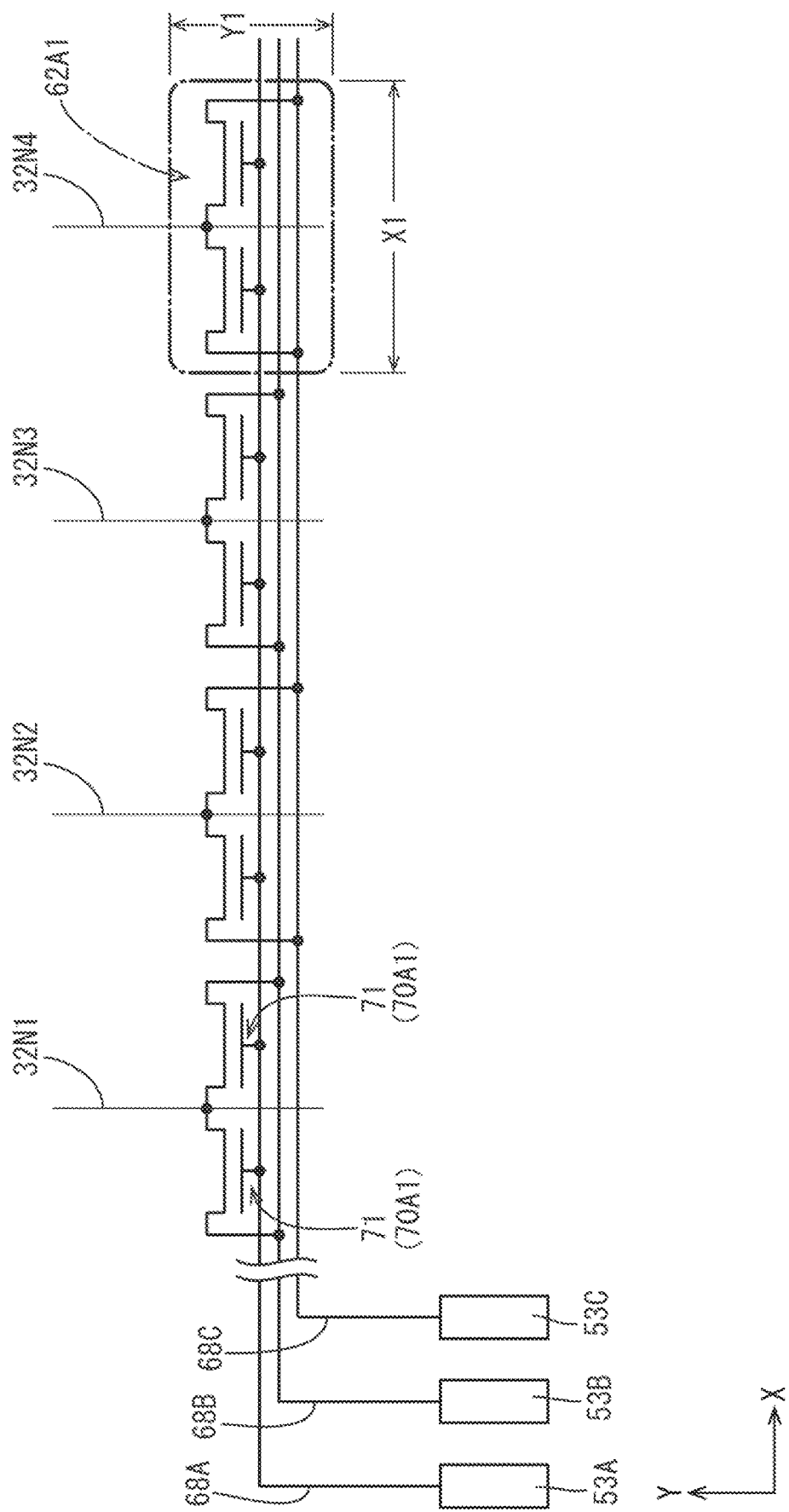
FIG. 7 is a circuit diagram illustrating a configuration of a first circuit.
Figure 8:
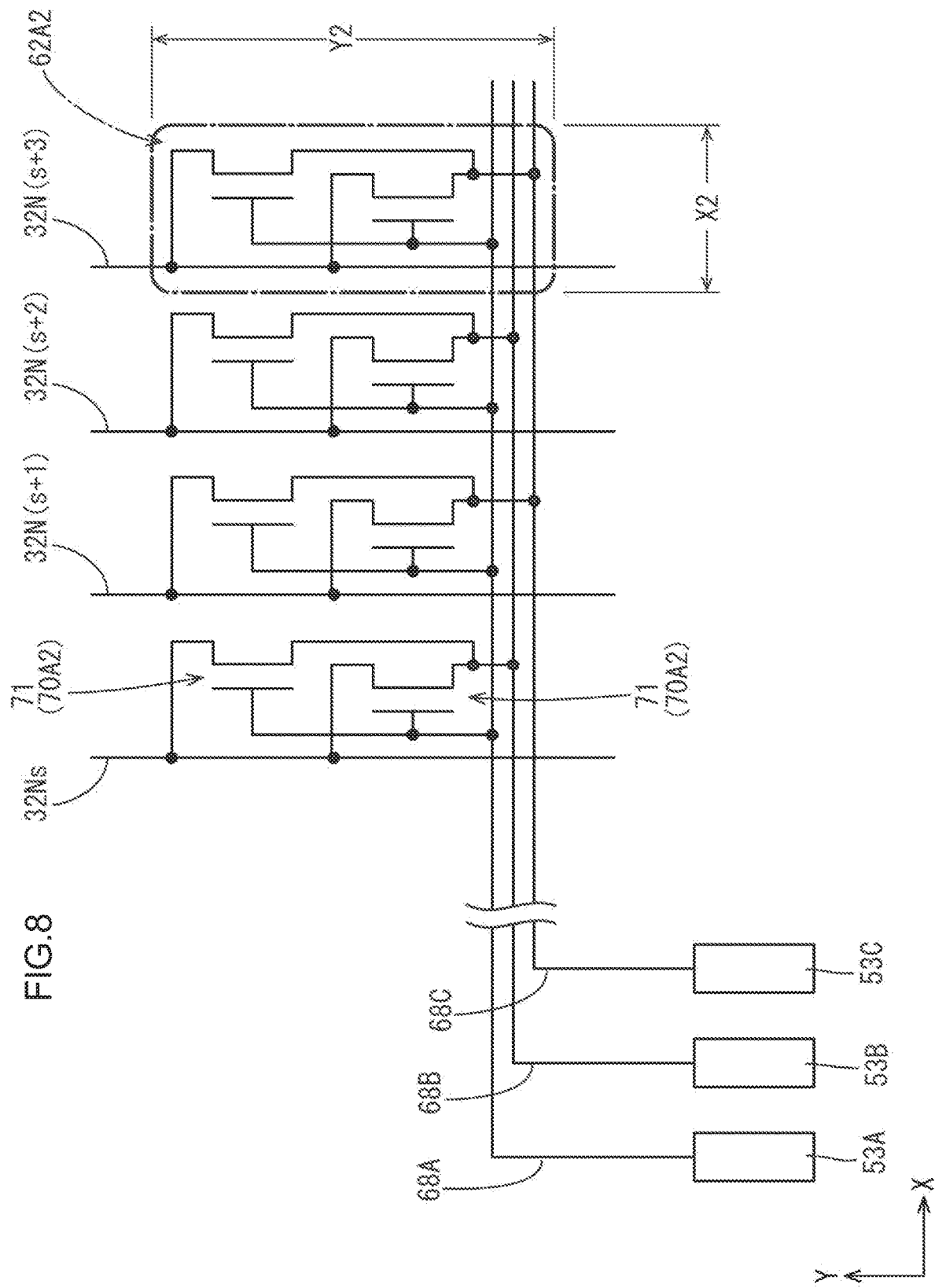
FIG. 8 is a circuit diagram illustrating a configuration of a second circuit.

In the first embodiment, the first circuits 62A1 are disposed in right and left sections of the column control circuit 62 and the second circuits 62A2 are disposed in a middle section thereof in FIG. 4. More in detail, among the N source lines 32, the first circuit 62A1 is provided for each of the source lines from the first source line 32N1 to the (s−1)th source line 32N (s−1) and the second circuit 62A2 is provided for each of the source lines from the s th source line 32Ns to the (N-s)th source line N(N-s). The first circuit 62A1 is provided for each of the source lines from the (N-s+1) th source line 32N (N-s+1) to the Nth source line 32NN (a portion thereof is illustrated in FIGS. 7 and 8). In other words, the first circuits 62A1 that have the large X-dimension and the small Y-dimension are provided for the column connection outer lines 66 that are long and routed in a portion far away from the center line CL, and the second circuits 62A2 that have the large X-dimension and the small Y-dimension are provided for the column connection outer lines 66 that are relatively short and routed near the center line CL.

Figure 6:
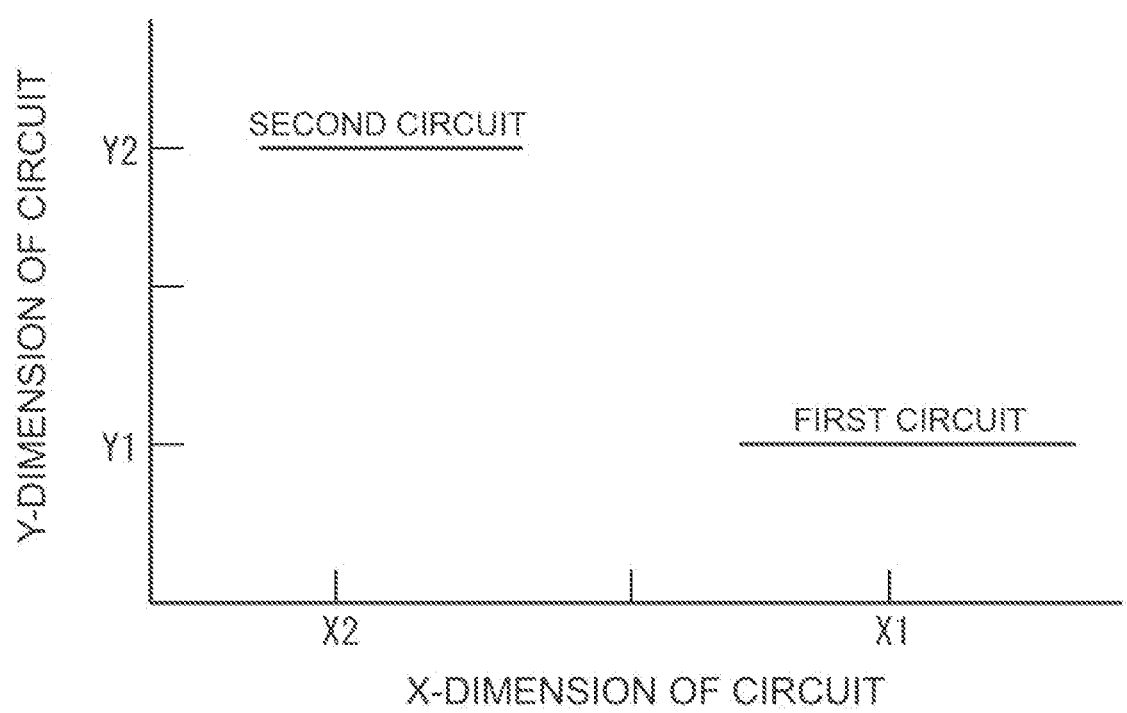
FIG. 6 is a graph illustrating relations between an X-dimension and a Y-dimension of a circuit.

An area necessary for each circuit (a unit circuit) included in the circuit will be considered. FIG. 6 illustrates relations between the X-dimensions of the circuits and the Y-dimensions of the circuits necessary with respect to the corresponding X-dimensions. If the Y-dimensions necessary for a unit circuit having X1 as the X-dimension and a unit circuit having X2 as the X-dimension are Y1 and Y2, respectively, the X-dimensions ((X1 or X2) and the Y-dimensions (Y1 or Y2) are inversely proportional and have a qualitative relation. Namely, for each test circuit 62A, if the X-dimension X2 in the arrangement direction is smalllike the second circuit 62A2, the Y-dimension Y2 in toe perpendicular direction must be increased, and if the X-dimension X1 in the arrangement direction is large like the first circuit 62A1, the Y-dimension Y1 in the perpendicular direction can be reduced. An area necessary for disposing the circuits having a certain function may not be always set freely and such an area is varied in a discrete (non-continuous) way as illustrated in FIG. 6.

Such relative relations be described specifically with reference to FIGS. 7 and 8. Hereinafter, the components illustrated in the left portion in FIG. 4 will be described. FIG. 7 is a circuit diagram illustrating a configuration of the first circuit 62A1. The first circuits 62A1 are arranged as follows. A test connection line 68B and a test terminal 53B are provided for supplying current to the source lines 32N (1+2n) that are (1+2n) th ones from, the left in the matrix area MA including the source line 32N1, which is a first one of the source lines 32 from the left in the matrix area MA, a source line 32N3 that is the (1+2) th one from, the left, and a source line 32N5 that is the (1+4) th one from, the left (n is 0 or a natural number, same in the following sections). A test connection line 68O and a test terminal 53O are provided for supplying current to the source lines 32N (2+2n) that are (2+2n) th ones from the left including a source line 32N2 that is a second one from the left, a source line 32N4 that is the (2+2) th one from, the left, and a source line 32N6 that is the (2+4) th one from the left. The test connection line 68O and the test terminal 53O are provided independently from the test connection line 68B and the test terminal 53B. According to such a configuration, the test circuit 62A is configured to supply current to the source lines 32N (1+2n) and to the source lines 32N (2+2n) independently from each other so that the corresponding pixels PX in the matrix area MA of the liquid crystal panel 10 are lighted. For example, if the test connection line 68A, which functions as a switch line, is supplied with current from the test terminal 53A to turn on a switch circuit included in each first circuit 62A1 and supply current to the test terminal 53B, the pixels PX connected to the source lines 32N(1+2n) are lighted in the matrix area MA and tested. Similarly, if the test connection line 68A is supplied with current to turn on the switch circuit and the test connection line 68O is supplied with current from the test terminal 53O, the pixels PX connected to the source lines 32N(1+2n) are lighted and tested.

Each of the first circuit 62A1 and the second circuit 62A2 includes two TFTs 71 including a first circuit component 70A1 and a second circuit component 70A2. As illustrated in FIG. 7, the first circuit 62A1 having a relatively large X-dimension X1 includes the two TFTs 71 that are arranged in the arrangement direction of the first circuits 62A1 (in the X-axis direction). As a result, the Y-dimension Y1 of the first circuit 62A1 can be smaller.

FIG. 8 illustrates a configuration of the second circuit 62A2. The arrangement of the second circuits 62A2 is also configured to test the pixels that are controlled via each of the source lines 32 in two groups similar to the first circuits 62A1. The test connection line 68B is provided for supplying current to the source lines 32N (s+2n) that are (s+2n) ones including the source line 32Ns that is a s th one or a most left one of the source lines 32 connected to the second circuits 62A2, a source line 32N (s+2) that is the (s+2) th one, and a source line 32N (s+2n) that is the (s+2n) th one. The test connection line 68C connected to the test terminal 53C is provided for supplying current to the source lines 32N (s+2n+1) that are (s+2n+1) th ones including the source line 32N (s+1) that is a (s+1) th one or a second one from the left one of the source lines 32 connected to the second circuits 62A2, a source line 32N (s+3) that is the (s+3) th one, and a source line 32N (s+2n+1) that is the (s+2n+1) th one. According to such configuration, similarly to the first circuits 62A1, each of a group of the source lines 32N (s+2n) and a group of the source lines 32N (s+2n+1) is supplied with current independently so that the corresponding pixels PX in the matrix area MA of the quid crystal panel 10 can be lighted. For example, if the test connection line 68A is supplied with current to turn on the switch circuit and current is supplied to the test terminal 53B or the test terminal 53C, the pixels PX connected to the source lines 32N (s+2n) or the pixels PX connected to the source pries 32N (s+2n+1) are lighted and tested.

The X-dimension of the second circuit 62A2 is the dimension X2, which is relatively small. Therefore, as illustrated in FIG. 8, the two TFTs 71, which are the second circuit components 70A2, are arranged in the perpendicular direction (the Y-axis direction). As a result, the Y-dimension is the dimension Y2, which is relatively large.

The column connection outer lines 66 includes first outer lines (an example of a first connection line) 66A1 that are extended from the respective first circuits 62A1 and second outer lines (an example of a second connection line) 66A2 that are extended from the respective second circuits 62A2. In a configuration that the test circuit 62A includes the first circuits 62A and the second circuits 62A2, it is difficult to arrange the first outer lines 66A1 and the second outer lines 66A2 in a same manner. As illustrated in FIG. 5, a distance between positions on the first circuits 62A1 from which the first outer lines 66A1 are extended, that is, an arrangement pitch PC1 of the first circuits 62A1 differs from a distance between positions on the second circuits 62A2 from which the second outer lines 66A2 are extended, that is, an arrangement pitch PC2 of the second circuits 62A2 (PC1=X1≠PC2=X2). With such a configuration, the first outer lines 66A1 and the second outer lines 66A2 cannot be routed while being inclined at a same angle and at a same line pitch.

In the first embodiment, the first outer lines 66A1 and the second outer lines 66A2 are intentionally arranged in different forms. In the first embodiment, the arrangement pitch PC2 of the second circuits 62A2 illustrated in FIG. 5 is set equal to the arrangement pitch PT of the column control terminals 52 (PC2=PT). Accordingly, the second outer line 66A2 extends from the second circuit 62A2 toward the column control terminal 52 along the Y-axis direction and extends at an angle θ2 (=90°) with respect to the arrangement direction of the second circuits 62A2 (the X-axis direction) to be connected to the column control terminal 52. If the arrangement pitch PC2 of the second circuits 62A2 differs from the arrangement pitch PT of the column control terminals 52 (PC2≠PT), the second outer line 66A2 may be extended as follows. After extending from the second circuit 62A2 toward the column control terminal 52 along the Y-axis direction, the second outer line 66A2 may be bent at an angle θ2 (≠90°) with respect to the arrangement direction of the second circuits 62A2 (the X-axis direction) and further extended while being inclined and bent again to be extended along the Y-axis direction to be connected to the column control terminal 52. A displacement with respect to the arrangement direction (the X-axis direction) between the second circuit 62A2 and the column control terminal 52 that are connected via the second outer line 66A2 is relatively small. Therefore, the angle 92 can be set such that a value of |tan θ2| is 1 (when the angle θ2 is 90°) or close to 1. An interval (a line pitch) between the adjacent second outer lines 66A2 at the inclined portions thereof can be maintained relatively large. With such a layout, the Y dimension W3Y2 of a routing area of the second outer lines 66A2 can be easily reduced while routing the connection lines with effective accuracy without causing any problems.

The first outer line 66A1 extends from the first circuit 62A1 toward the column control terminal 52 (toward the lower side in FIG. 5) along the Y-axis direction, and the first outer line 66A1 is bent at an angle θ1 with respect to the arrangement direction of the test circuits 62A (the X-axis direction) and further extended while being inclined and bent again to be extended along the Y-axis direction to be connected to the column control terminal 52. A displacement with respect to the arrangement direction (the X-axis direction) between the first circuit 62A1 and the column control terminal 52 that are connected via the first outer line 66A1 is relatively large. Therefore, a routing area necessary for the first outer lines 66A1 is larger than that for the second outer lines 66A2. To reduce the Y dimension W3Y1 of the routing area of the first outer lines 66A1, the angle θ1 is preferably set such that an absolute value of the tangent of el (|tan θ1|) is a small value. However, if an interval between the positions from which the first outer lines 66A1 are extended is fixed, the line pitch of the first outer lines 66A1 at the inclined portions thereof becomes smaller as |tan θ1| becomes smaller (as the inclination becomes steeper). If so, the connection lines are less likely to be routed without causing any problems. The connection lines such as the first outer lines 66A1 are formed with patterning a metal film with the photolithography method, for example; however, the accuracy of such line routing is limited. Therefore, a certain routing area is necessary for forming the first outer lines 66A1 while achieving the effective accuracy and the Y dimension W3Y1 of the routing area needs to be maintained to be a certain value or greater.

As illustrated in FIG. 4, a frame width WT of the terminal-side frame area FAT in the first embodiment is defined by the Y-dimension W1 of the routing area of the column connection inner lines 67, the Y-dimension W2 of the column control circuit 62, and the Y-dimension W3 of the routing area of the column connection outer lines 66. Such dimensions are components related to the circuits and the connection lines. Thus, to reduce the frame width WT, a total of the above dimensions (W1+W2+W3) is preferably reduced. The total of (W2+W3) is defined by a greater value out of a total of (Y1+W3Y1) or a total of (Y2+W3Y2) as illustrated in FIG. 5. The value of (Y1+W3Y1) is a total of the Y-dimension Y1 of the first circuit 62A1 and the Y-dimension W3Y1 of the routing area of the first outer lines 66A1. The value of (Y2+W3Y2) is a total of the Y-dimension Y2 of the second circuit 62A2 and the Y-dimension W3Y2 of the routing area of the second outer lines 66A2.

In a prior art configuration, even if the circuit includes various kinds of circuits having different X-dimensions and different Y-dimensions, the circuit have different X-dimensions such as X1 or X2 and all of the circuits have a same Y-dimension such as a large dimension Y2. With such a configuration, in the circuit including the first circuits 62A1 and the second circuits 62A2 like the first embodiment, the total value (W2+W3) is a total of the Y-dimension Y2 of the second circuit, which is a relatively large dimension, and the Y-dimension W3Y1 of the first outer line 66A1, which is a relatively large dimension (W2+W3=Y2+W3Y1).

On the other hand, the column control circuit 62 in the first embodiment is characterized in that not only the X-dimension but the Y-dimension of each test circuit 62A is intentionally set to different dimensions of Y1 or Y2 for every circuit. Therefore, the total value (W2+W3) is defined by a larger one of the total values of (Y1+W3Y1) and (Y2+W2Y2). The value (Y1+W3Y1) is a total of the Y-dimension Y1 of the first circuit 62A1, which is a relatively small dimension, and the Y-dimension W3Y1 of the routing area of the first outer lines 66A1, which is a relatively large dimension. The value (Y2+W2Y2) is a total of the Y-dimension Y2 of the second circuit 62A2, which is a relatively large dimension, and the Y-dimension W3Y2 of the routing area of the second outer lines 66A2, which is a relatively small dimension. Here, Y1+W3Y1<Y2+W3Y1 and Y2+W3Y2<Y2+W3Y1 are satisfied. Therefore, in the first embodiment, the value (W2+W3) can be smaller than that of the prior configuration. Namely, the routing area necessary for the column connection outer lines 66 can be provided while maintaining a relatively small distance with respect to the Y-axis direction between the terminal side MAT side edge of the column control circuit 62 including the array of the test circuits 62A (the upper edge in FIGS. 4 and 5) and the terminal side MAT side edges of the array of the column control terminals 52. Thus, the frame width WT can be smaller as a whole while reducing a width of the terminal-side frame area FAT.

As described earlier, the electronic component board 30 of the first embodiment includes the column control circuit 62 including the test circuits 62A, and each of the circuits 62A1, 62A2 of the test circuits 62A includes the TFTs 71, which are the circuit components 70A1, 70A2 such that the arrangement of the TFTs 71 are intentionally varied. The test circuits 62A include the first circuit 62A1 and the second circuit 62A2 that have different X-dimensions in the arrangement direction of the test circuits 62A (the X-axis direction) and different Y-dimensions in the perpendicular direction (the Y-axis direction). According to such a configuration, the column control circuit 62 is configured such that the Y-dimension thereof is changed step by step along the arrangement direction of the test circuits 62A. The frame width WT of the terminal-side frame area FAT is defined by the Y-dimension W2 of the test circuit 62A included in the column control circuit 62 and the Y-dimensions W1 and W3 of the routing areas of the column connection inner lines 67 and the column connection outer lines 66.

As described before, the electronic component board 30 of the first embodiment includes the matrix area (the signal line area) MA where the source lines (signal lines) 32 extend and the frame area. FA that surrounds the matrix area MA. In the frame area FA, the column control terminals 52, the column connection inner lines 67, the column connection outer lines 66, and the test circuits 62A are disposed. The signals from external devices are input to the source lines 32 via the column control terminals 52. The column connection inner lines 67 and the column connection outer lines 66 connect the source lines 32 and the column control terminals 52. The test circuits 62A are disposed between the matrix area MA and the column control terminals 52 and are arranged along the terminal side (a portion of the outline of the matrix area MA) MAT and on the respective line paths of the column connection inner lines 67 and the column connection outer lines 66. The column connection inner lines 67 and the column connection outer lines 66 are routed such that a whole outline thereof is narrowed to be in a fan-shape from the source lines 32 toward the column control terminals 52. The test circuits 62A include the first circuits 62A1 and the second circuits 62A2. Compared to the second circuit 62A2, the first circuit 62A1 has a greater X-dimension (the dimension in the arrangement direction of the circuits) and a smaller Y-dimension (the dimension in the perpendicular direction perpendicular to the arrangement direction of the circuits).

If the arrangement pitch PC of the circuits is made smaller, the dimension (the X-dimension) of the circuit including the array of the circuits in the circuit arrangement direction can be decreased and the area Z necessary for preventing contact of various lines and the components can be provided. However, to ensure the routing accuracy of the connection lines, the perpendicular-direction dimension (the Y-dimension) of the routing area that allows the connection lines to extend while being inclined is necessarily set to a certain value or greater. On the other hand, if the arrangement pitch PC is made greater, the X-dimension of the circuits in the arrangement direction is increased; however, the interval between the positions of the adjacent circuits from which the connection lines are extended becomes larger. This increases layout varieties of the connection lines. The Y-dimension of the routing area in the perpendicular direction is less likely to be increased and the frame width can be smaller. The circuit includes various types of circuits having different X-dimensions and some of the circuits are arranged at different arrangement pitches so that the advantages described earlier are both obtained and the frame width can be reduced while ensuring the area. Z.

According to the configuration of the first embodiment, the first circuits 62A1 and the second circuits 62A2 included in the array of the test circuits 62A have different X-dimensions so that the arrangement pitch PC of the test circuits 62A is partially changed, and also the first circuits 62A1 and the second circuits 62A2 have different Y-dimensions. According to such a configuration, the frame width of the terminal-side frame area FAT can be reduced while ensuring an area necessary for the circuits 62A1, 62A2 and particularly increasing an area used for the routing of the first outer lines 66A1 that connect the first circuits 62A and the column control terminals 52. In the above description, "a circuit" is referred to indicate for convenience a section including an electrode and thin film on the electronic component board and having an area or a predetermined size that is disposed for every signal line on the electronic component board. A description that "arranged along; a portion of the outline of the signal line area" also includes following arrangement. For example, if a part of the outline is curved, the description includes not only the arrangement that is along the curved outline but also the arrangement that is substantially straight along the curved outline as a whole.

In the electronic component board 30 of the first embodiment, a displacement between the first circuit 62A1, which is connected to the first outer line (the first connection line) 66A1, and the corresponding column control terminal 52 in the circuit arrangement direction (the X-axis direction) is greater than a displacement between the second circuit 62A2 and the corresponding column control terminal 52. The angle θ1 at which the first outer lines 66A1 connecting the column control terminals 52 and the first circuits 62A1 are inclined with respect to the X-axis direction and the angle θ2 at which the second outer lines 66A2 connecting the column control terminals 52 and the second circuits 62A2 are inclined with respect to the X-axis direction satisfy |tan θ1|<|tan θ2|.

According to the configuration in the first embodiment, since the displacement in the X-axis direction between the second circuit 62A2 and the corresponding column control terminal 52 that are connected via the column connection outer line 66 is small, the second outer lines 66A2 connecting the column control terminals 52 and the second circuits 62A2 can be extended at an angle closer to 90° with respect to the arrangement direction (a value of |tan θ2| can be close to 1). Therefore, even if the arrangement pitch PC2 of the second circuits 62A2 is small, the Y-dimension W3Y2 of the routing area of the second outer lines 66A2 can be easily reduced while the arrangement pitch between the second outer lines 66A2 necessary for preventing occurrence of problems can be maintained at the inclined portions thereof. On the other hand, since the arrangement pitch of the first circuits 62A1 is large, the first outer lines 66A1 connecting the column control terminals 52 and the first circuits 62A1 need to be extended from the first circuits 62A1 in the X-axis direction. Therefore, the first outer lines 66A1 need to be inclined with respect to the X-axis direction to set the value of |tan θ1| smaller. Therefore, it is difficult to arrange the first outer lines 66A1 so as not to contact each other and the Y-dimension W3Y1 of the routing area in the perpendicular direction is necessarily increased to some extent. The line layout for the first circuits 62A1 is difficult in relation to the arrangement of the column control terminals 52 that are to be connected thereto. However, in the present technology, the arrangement pitch PC1 (equal to the X-dimension X1) of the first circuits 62A1 is increased and the Y-dimension Y1 thereof is reduced to increase the layout variety of the connection lines. Thus, the required dimension (the Y-dimension W3Y1) of the routing area in the perpendicular direction is restricted and the frame width of the terminal-side frame area FAT is reduced as a whole.

In the electronic component board 30 of the first embodiment, the arrangement direction of the two (multiple) TFTs 71 (the first circuit components 70A1) included in the first circuit 62A1 differs from that of the TFTs 71 (the second circuit components 70A2) included in the second circuit 62A2.

According to the configuration of the first embodiment, shapes or arrangement of the circuit components 70A1, 70A2 included in the circuits 62A1, 62A3 are changed such that a necessary area for disposing the circuits 62A1, 62A2 can be ensured and the dimensions of the column control circuit 62 in the X-axis direction (the arrangement direction) and the Y-axis direction. (the perpendicular direction) can be adjusted as desired. The arrangement directions of the circuit components 70A1, 70A2 do not necessarily differ from each other but at least one of the shapes, the arrangement directions, and the number may differ.

In the electronic component board 30 of the first embodiment, the first circuits 62A1 and the second circuits 62A2 correspond to the test circuits 62A for supplying test signals to the source lines 32.

According to the configuration of the first embodiment, the test circuits 62A necessary for testing the source lines 32 can be arranged efficiently.

In the electronic component board 30 of the first embodiment, the signal lines disposed in the matrix area MA include the source lines (column lines) 32 and the gate lines (row lines) 31 that are arranged in a matrix. The pixel electrodes 35 are disposed at the intersections of the source lines 32 and the gate lines 31 in the matrix area MA and an image is displayed on the matrix area MA.

According to the configuration of the first embodiment, the present technology can be usefully applied to the electronic component board (a matrix substrate) 30 for the liquid crystal panel (a display panel) 10 that particularly demands reduction in the frame width while the number of circuits and lines increasing according to the enhancement of precision. For example, the present technology can be applied to an electronic component board including signal lines related to image display such as the source lines 32 and the gate lines 31 and signal lines related to touch sensing.

The liquid crystal panel 10 according to the first embodiment includes the electronic component board 30 having the earlier described configuration.

According to the configuration of the first embodiment, the liquid crystal panel (the display panel) 10 including a reduced frame width can be obtained while satisfying other required properties such as high resolution.

According to the configuration of the first embodiment, the test circuits 62A and the column connection outer lines 66 and the column connection inner lines 67 that are connected to the test circuits 62A can be arranged in the terminal-side frame area FAT efficiently. As a result, the liquid crystal panel 10 having a reduced frame width can be obtained while satisfying required properties such as high resolution.

Second Embodiment

A second embodiment will be described with reference to FIGS. 9 to 12. A liquid crystal panel 210 of the second embodiment includes the source lines 32 in the matrix area MA and the number of the source lines 32 is M. The total number of column control terminals 252 in the terminal-side frame area FAT of an electronic component board 230 is M (M is a multiple of two). The liquid crystal panel 210 of the second embodiment differs from the liquid crystal panel 10 of the first embodiment in that the arrangement pitch of the column control terminals 252 is not constant and the column control terminals 252 are divided into two or more groups each including M/2 column control terminals 252. The liquid crystal panel 210 with high resolution generally includes a great number of source lines 32. Therefore, the column control terminals 252 are often divided into multiple groups and configured to be driven like the liquid crystal panel 210 of the second embodiment. Hereinafter, configurations similar to those of the first embodiment are provided with the same symbols, and operations and effects similar to those of the first embodiment will not be described (same in third and fourth embodiments).

Figure 9:
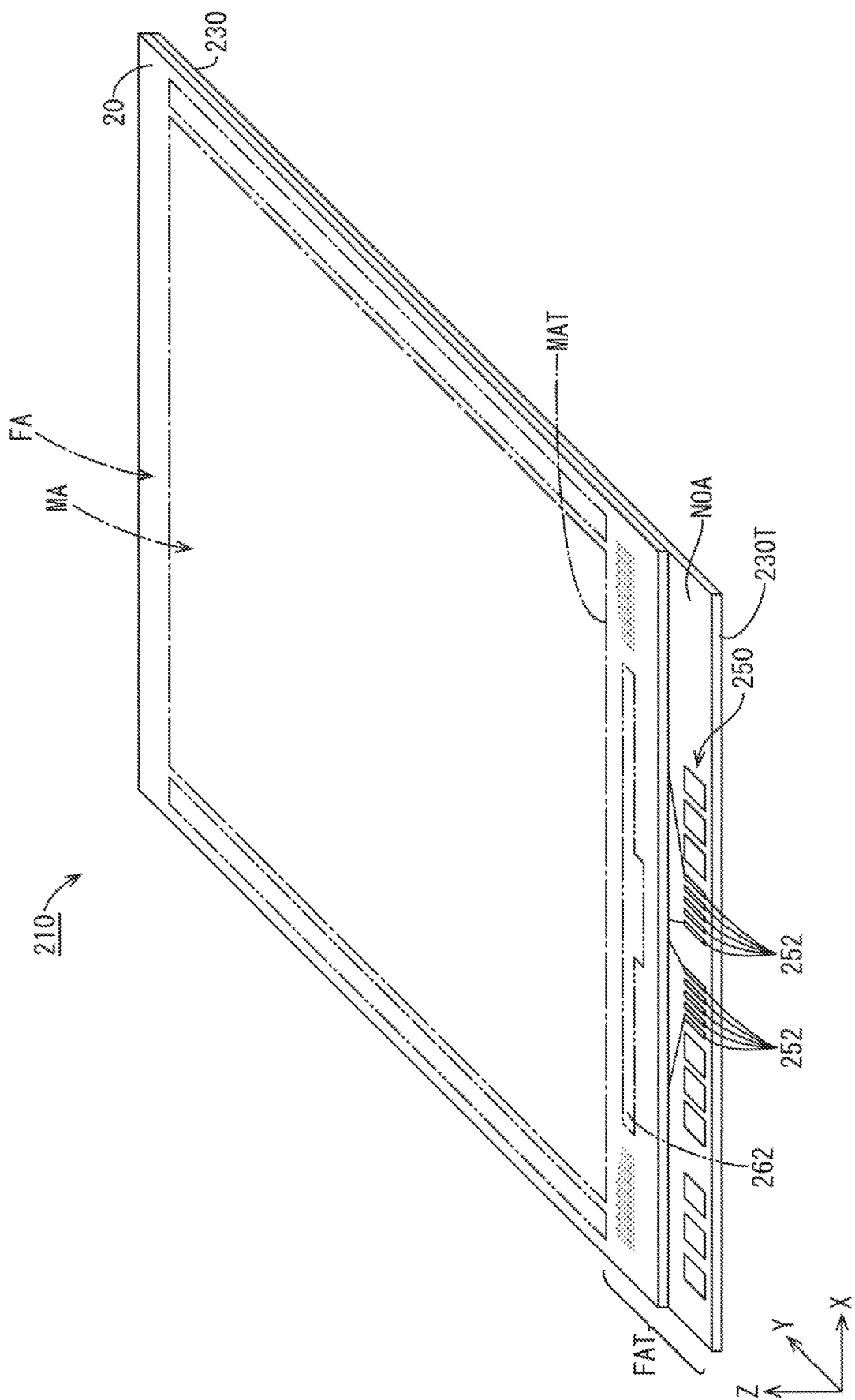
FIG. 9 is a perspective view illustrating a general configuration of a liquid crystal panel according to a second embodiment.
Figure 10:
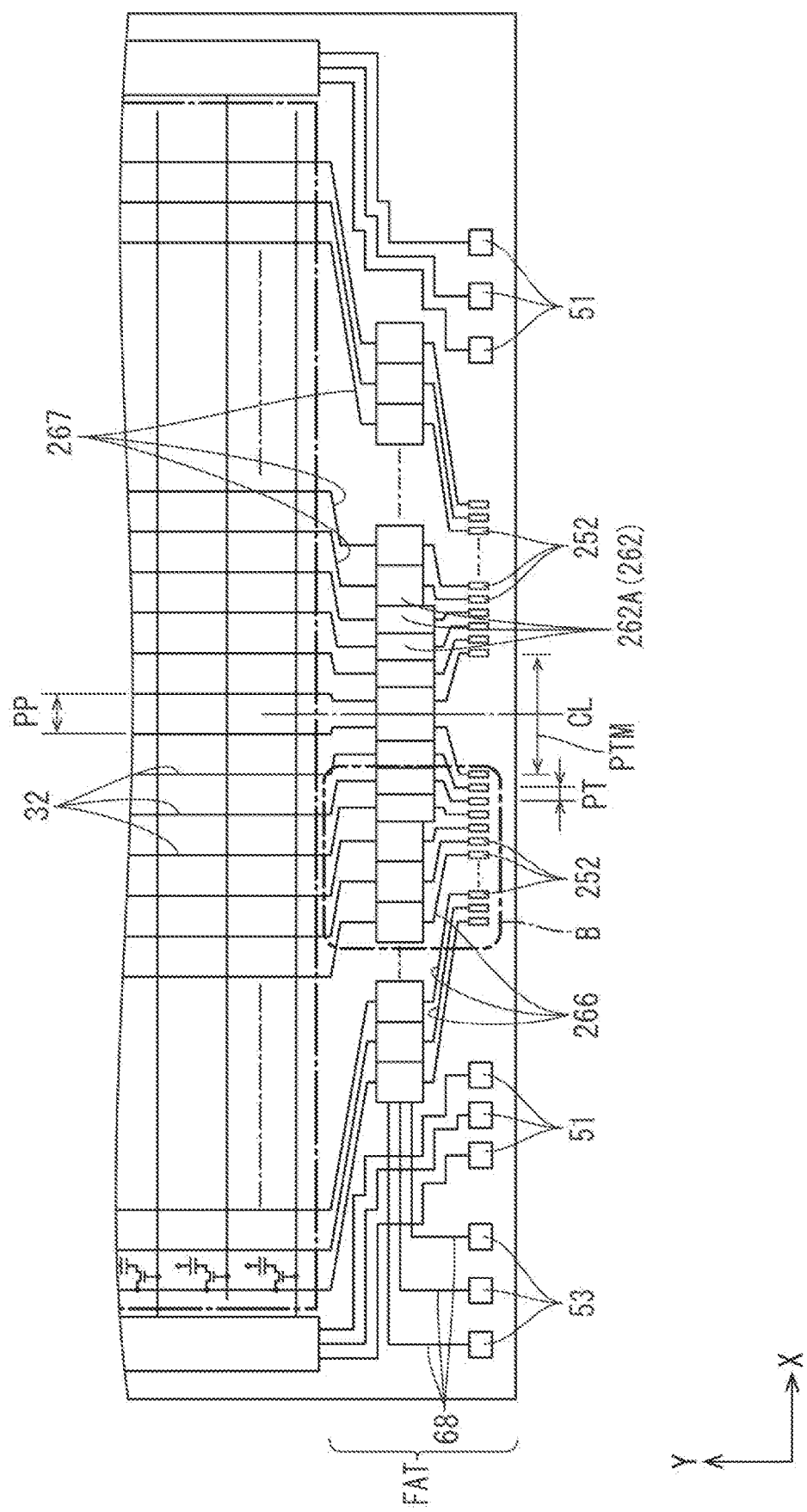
FIG. 10 is a schematic view illustrating a planar configuration of a terminal-side frame area FAT of an electronic component board and therearound.

As illustrated in FIG. 9, in the matrix area MA of the electronic component board 230 in the second embodiment, the source lines 32 whose total number is M are arranged at the line pitch PP that is same as that in the first embodiment. As illustrated in FIG. 1, a column control circuit 262 including test circuits 262A whose total number is M is disposed in the terminal-side frame area FAT. The test circuits 252A are arranged along the terminal side MAT. An external connection terminal section 250 that is disposed along a terminal-side edge 230T includes the column control terminals 252 whose total number is M. As illustrated in FIGS. 9 and 10, the arrangement pitch of the column control terminals 252 in the second embodiment is not constant and the column control terminals 252 are divided into two groups so as to sandwich a center line CL extending along the Y-axis direction of the electronic component board 230 and the number of the column control terminals 252 included in each of the groups is M/2. As illustrated in FIG. 10, the column control terminals 252 included in each group are arranged at the certain arrangement pitch PT same as that of the column control terminals 52 in the first embodiment and a space PTM is provided between the groups.

Figure 11:
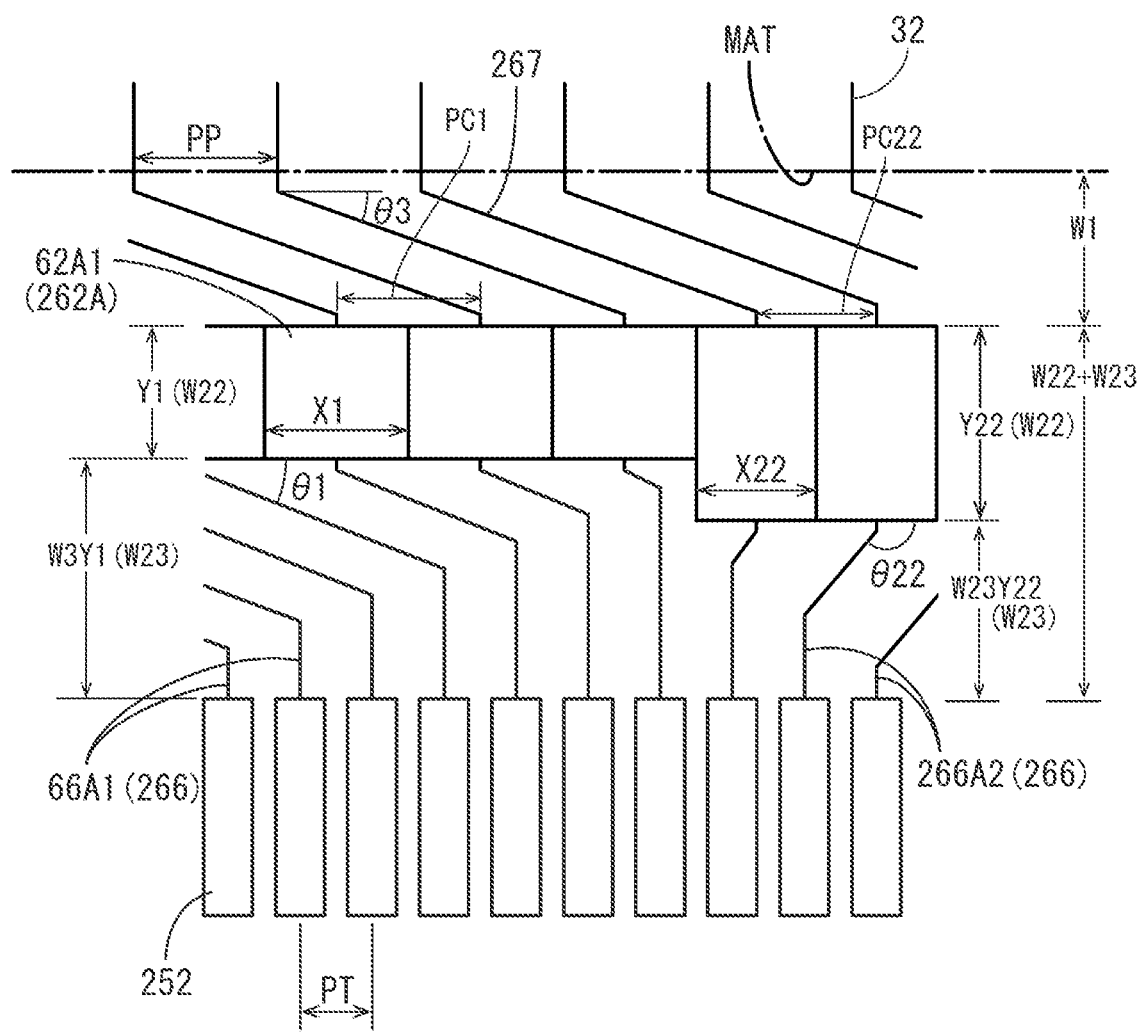
FIG. 11 is a partially enlarged view of an area B in FIG. 10.

As illustrated in FIG. 11, the test circuits 262A of the second embodiment include the first circuits 62A1, which are similar to those of the first embodiment, and second circuits 262A2 The second circuits 262A2 have dimensions different from those of the second circuits 62A2 of the first embodiment. In the second embodiment, among the source lines 32, the number of which is M, the first circuits 62A1 are provided for the respective source lines 32 from the first one to a (t−1)th one, respectively, and the second circuits 262A2 are provided for the respective source lines 32 from a t th one to a (M−t) th one, respectively. Further, the first circuits 62A1 are provided for the respective source lines 32 from a (M−t+1) th one to a M th one.

The second circuit 262A2 of the second embodiment has an X-dimension X22 that is greater than the X-dimension X2 of the second circuit 62A2 of the first embodiment. The X-dimensions and the Y-dimensions are inversely proportional and have a qualitative relation as is described in the first embodiment with reference to FIG. 6. The X-dimension of the second circuit 262A2 is X22 that is smaller than X1 and greater than X2. In such a second circuit 262A2, a Y-dimension Y22 is greater than Y1 and smaller than Y2.

Figure 12:
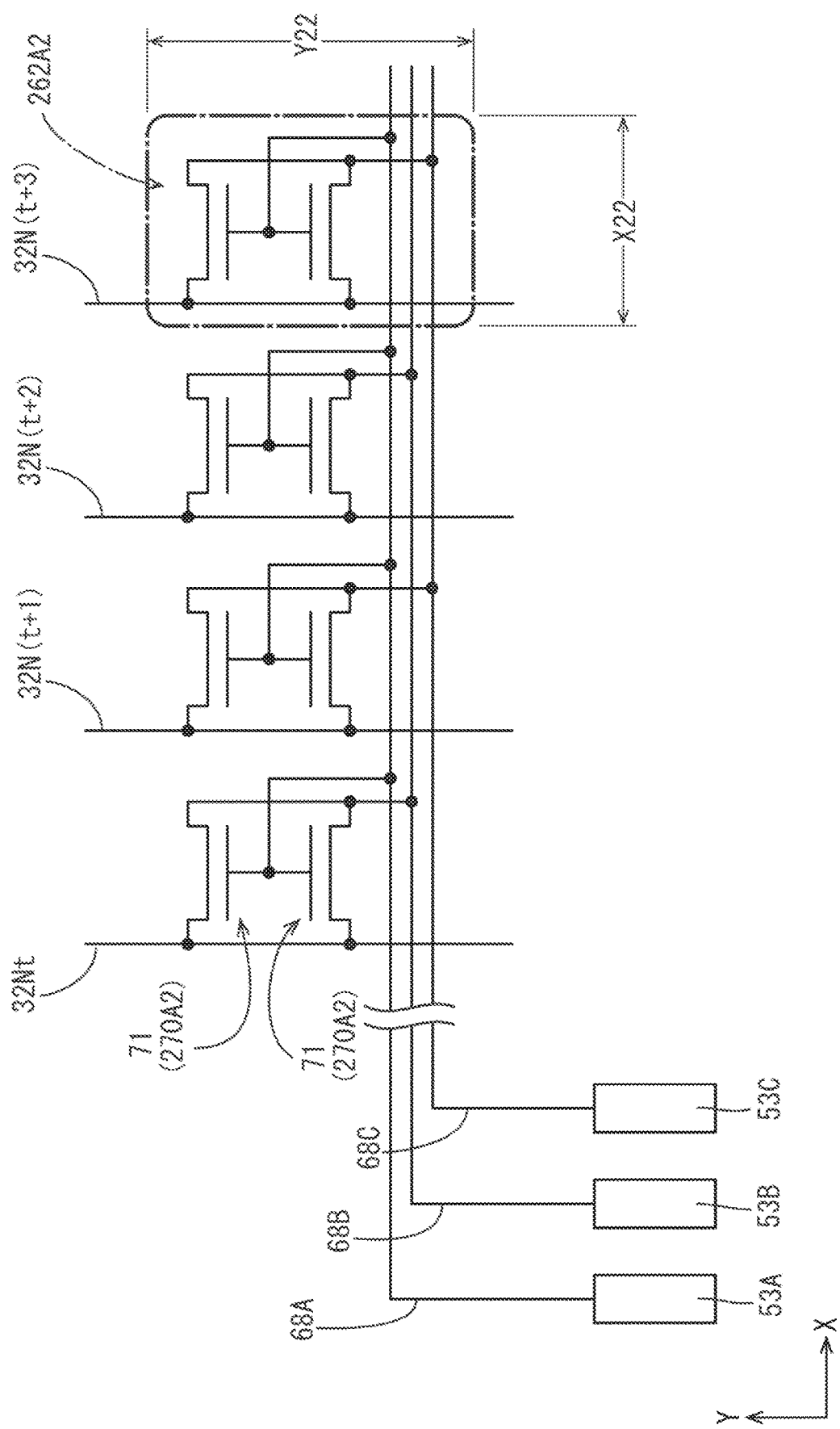
FIG. 12 is a circuit diagram illustrating a configuration of a second circuit according to the second embodiment.

FIG. 12 is a typical circuit diagram illustrating a configuration of the second circuit 262A2 according to the second embodiment. The second circuit 262A2 includes two TFTs 71 as second circuit components 270A2. In the second circuit 262A2 of the second embodiment, similar to the second circuit 62A2 of the first embodiment, the two TFTs 71 are arranged along the perpendicular direction (the Y-axis direction) that is perpendicular to the arrangement direction (the X-axis direction) of the second circuits 262A2. The TFTs 71 are arranged while the directions thereof being changed such that the Y-dimension is not increased too much. As a result, the X-dimension X22 and the Y-dimension Y22 of the second circuit 262A2 of the second embodiment are a middle size.

As illustrated in FIG. 12, the second circuits 262A2 of the second embodiment are also configured to test the pixels, which are controlled by the source lines 32, in two groups similar to the first circuits 62A1. The test connection line 68B connected to the test terminal 53B is provided for supplying current to the source lines 32N(t+2n) that are (t+2n)th ones including the source line 32Nt that is a t th one or a most left one of the source lines 32 connected to the second circuits 262A2, a source line 32N(t+2) that is the (t+2)th one, and a source line 32N(t+2n) that is the (t+2n)th one. The test connection line 68C connected to the test terminal 53C is provided for supplying current to the source lines 32N(t+2n+1) that are (t+2n+1)th ones including the source line 32N(t+1) that is a (s+1) th one or a second one from the left one of the source lines 32 connected to the second circuits 262A2, a source line 32N(t+3) that is the (t+3)th one, and a source line 32N(t+2n+1) that is the (t+2n+1)th one. According to such a configuration, the second circuit 262A2 is configured such that each of a group of the source lines 32N(t+2n) and a group of the source lines 32N(t+2n+1) is supplied with current independently so that the corresponding pixels PX in the matrix area MA of the liquid crystal panel 210 can be lighted. For example, if the test connection line 68A is supplied with current to turn on the switch circuit and current is supplied to the test connection line 68B or the test connection line 68C, the pixels connected to the source lines 32N(t+2n) or the pixels connected to the source lines 32N(t+2n+1) are lighted and tested.

As illustrated in FIG. 11, in the second embodiment also, all of the test circuits 262A are arranged along the X-axis direction without having a space therebetween. Therefore, the arrangement pitch PC1 of the first circuits 62A1 is equal to the X-dimension X1 of the first circuit 62A1 (PC1=X1) and the arrangement pitch PC22 of the second circuits 262A2 is equal to the X-dimension X22 of the second circuit 262A2 (PC22=X22). In the second embodiment, the arrangement pitch PC22 of the second circuits 262A2, that is the X-dimension 22, is set greater than the arrangement pitch PT of the column control terminals 252 included in each group (PC22=X22>PT). The space PTM is provided between the groups of the column control terminals 252 of the second embodiment. Therefore, even if the X-dimension of the second circuit 262A2 is set as described earlier, column connection inner lines 267 and first outer lines 66A1 are routed easily. In the second embodiment, as illustrated in FIG. 11, the column connection inner line 267 includes an inclined portion that is inclined at an inclination angle with respect to the arrangement direction (the X-axis direction) of the test circuits 262A. The inclination angle is θ3 that is same as the inclination angle of the first embodiment and the Y-dimension of the routing area of the column connection inner lines 267 is same as the Y-dimension W1 of the routing area in the first embodiment. The column control terminal 252 and the first circuit 62A1 are connected to each other via the first outer line 66A1 that is routed similarly to the first embodiment.

After extending from the second circuit 262A2 toward the column control terminal 252 along the Y-axis direction, the second outer line 266A2 that connects the second circuit 262A2 and the column control terminal 252 may be bent at an angle θ22 (≠90°) with respect to the arrangement direction of the second circuits 262A2 (the X-axis direction) and further extended while being inclined and bent again to be extended along the Y-axis direction to be connected to the column control terminal 252. A displacement with respect to the arrangement direction (the X-axis direction) between the second circuit 262A2 and the column control terminal 252 that are connected via the second outer line 266A2 is relatively small. Therefore, the angle 622 can be set such that a value of |tan θ22| is close to 1. An interval (a line pitch) between the adjacent second outer lines 266A2 at the inclined portions thereof can be maintained relatively large. With such layout, the Y dimension W23Y22 of a routing area of the second outer lines 266A2 can be easily reduced while routing the connection lines with effective accuracy without causing any problems.

In the second embodiment also, the frame width WT of the terminal-side frame area FAT is defined by the Y-dimension W1 of the routing area of the column connection inner lines 267, the Y-axis dimension W22 of the column control circuit 262, and the Y-dimension W23 of the routing area of the column connection outer lines 266. A total value (W22+W23) is defined by a larger one of the total values of (Y1+W3Y1) and (Y2+W23Y22). The value (Y1+W3Y1) is a total of the Y-dimension Y1 of the first circuit 62A1 and the Y-dimension W3Y1 of the routing area of the first outer lines 66A1. The value (Y2+W23Y22) is a total of the Y-dimension Y22 of the second circuit 262A2 and the Y-dimension W23Y22 of the routing area of the second outer lines 266A2. In the second embodiment also, the frame width WT of the terminal-side frame area FAT is substantially defined by the Y-dimensions of the first circuit 62A1 and the routing area of the first outer lines 66A1, that is (Y1+W3Y1). Even if the Y-dimension W3Y1 of the routing area does not change from the conventional one, the Y-dimension Y1 of the first circuit 62A1 is set smaller and the frame width WT can be reduced.

As described earlier, in the second embodiment, the liquid crystal panel 210 includes the column control terminals 252 that are divided into multiple groups and are arranged. The liquid crystal panel 210 includes the circuits 62A1, 262A2 that include the TFTs 71 as the circuit components 70A1, 270A2. The arrangement of the TFTs 71 is different in each of the circuits 62A1, 262A2. The first circuit 62A1 and the second circuit 262A2 have different X-dimensions in the arrangement direction of the test circuits 262A (the X-axis direction) and different Y-dimensions in the perpendicular direction (the Y-axis direction). Accordingly, the column control circuit 262 is configured such that the Y-dimension thereof is changed step by step along the arrangement direction of the test circuits 262A.

The present technology can be effectively applied to the electronic component board 230 that includes the column control terminals 252 divided in the groups as is in the second embodiment. The operations and effects same as those described in the first embodiment can be obtained and the frame width of the terminal-side frame area FAT can be reduced.

Third Embodiment

A third embodiment will be described with reference to FIGS. 13 to 15. In the third embodiment, a liquid crystal panel 310 includes an electronic component board 330 including an auxiliary line 369. The present technology is applied to the liquid crystal panel 310 at crossing sections 362A where the source lines 32 and the auxiliary line 369 cross. The auxiliary line 369 is to be used as detour lines if the source line 32 in the matrix area MA is disconnected.

Figure 13:
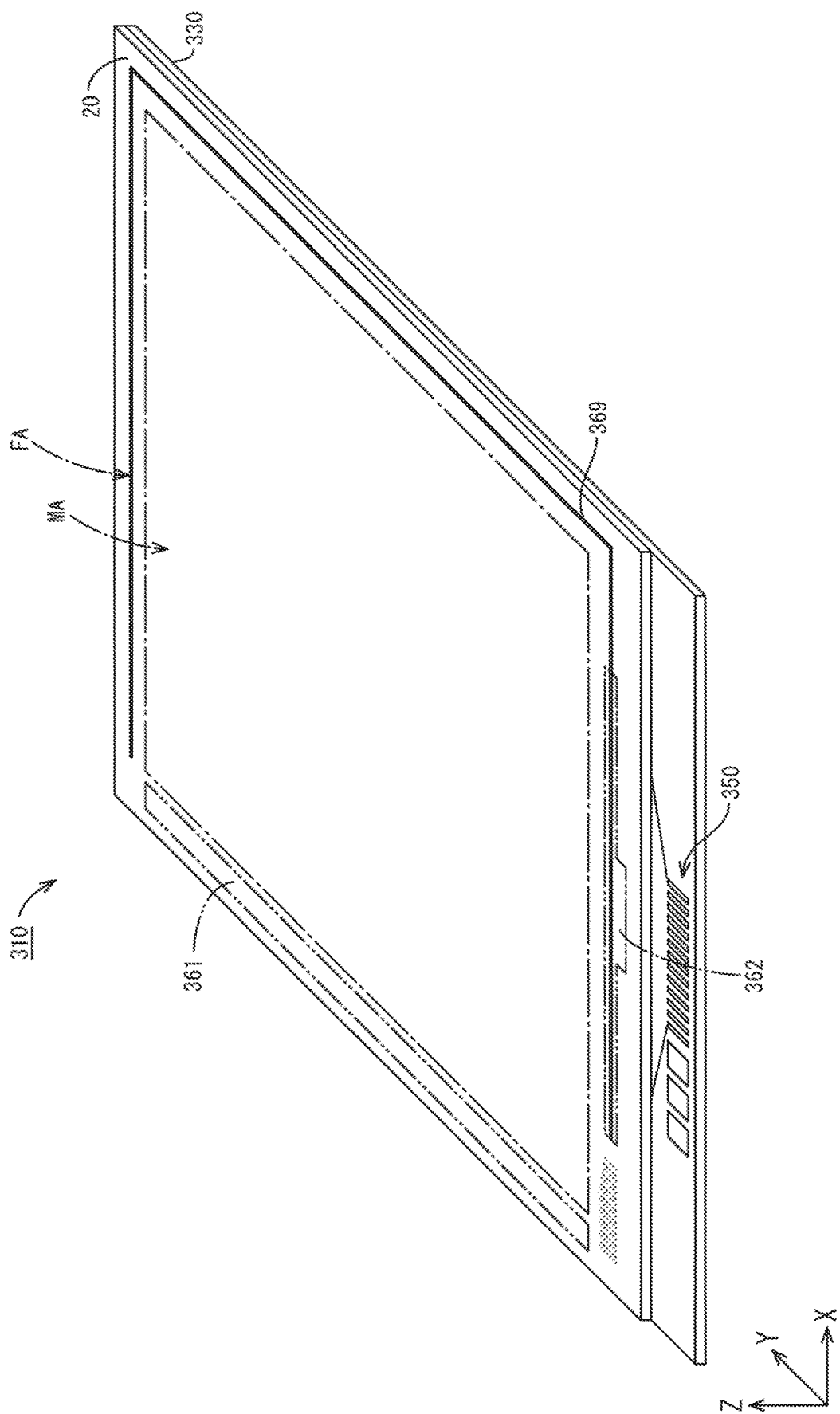
FIG. 13 is a perspective view illustrating a general configuration of a liquid crystal panel according to a third embodiment.

As illustrated in FIG. 13, in the liquid crystal panel 310 of the third embodiment, the auxiliary line 369 extends from and through the terminal-side frame area FAT, and through the frame area FA on the right side in FIG. 13, and further extends through to the frame area FA on an opposite terminal side from the terminal-side frame area FAT. The frame area FA on the opposite terminal side and the frame area terminal-side frame area FAT sandwich the matrix area MA therebetween. In the terminal-side frame area FAT and the frame area FA on the opposite terminal side while having the matrix area MA therebetween, the auxiliary line 369 crosses the source lines 32 while being insulated therefrom. In the third embodiment, no row control circuit is disposed in the frame area FA that is on the right side of the matrix area MA and on which the auxiliary line 369 is disposed. A row control circuit 361 is disposed only on a left-side frame area FA.

Figure 14:
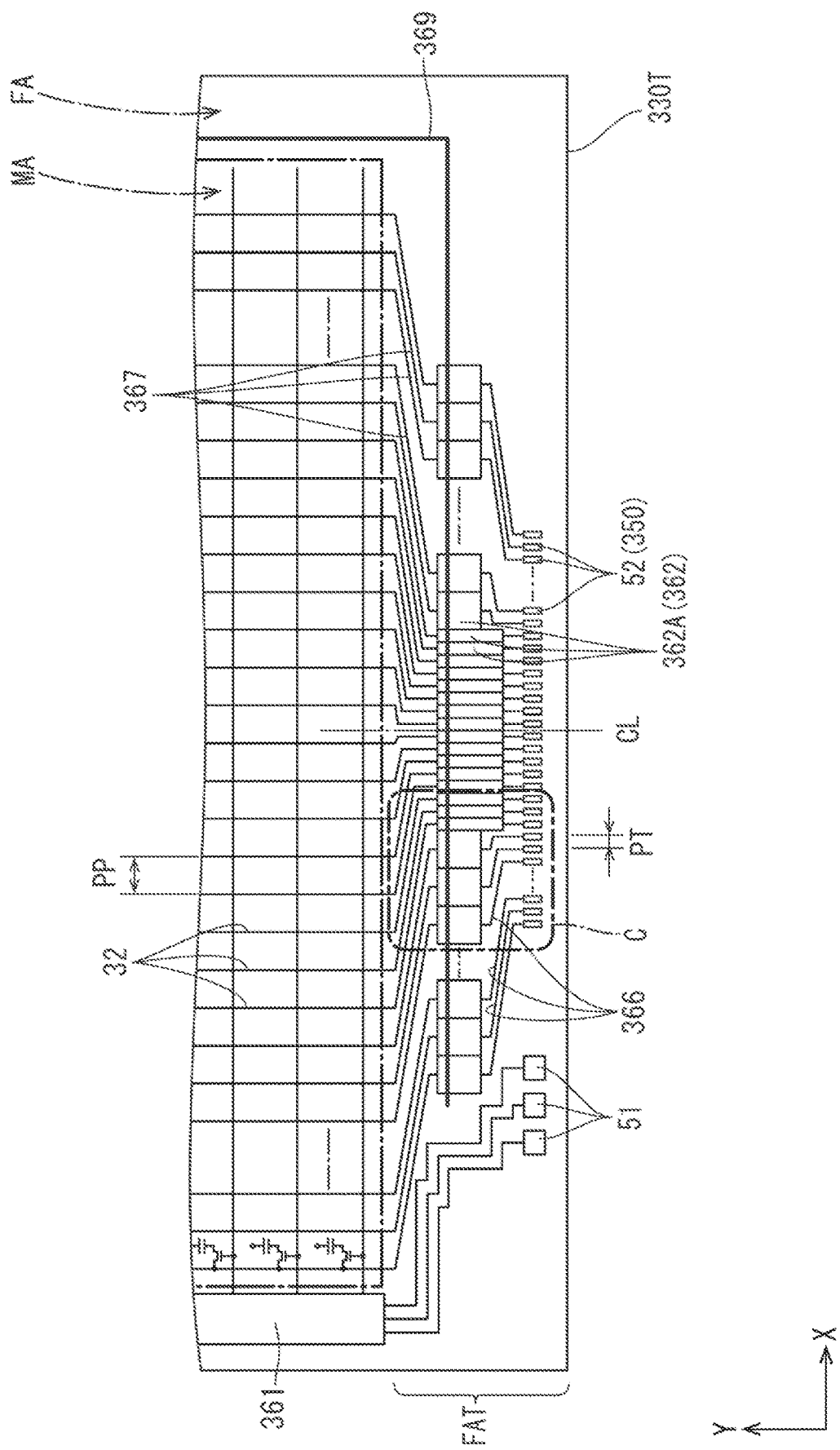
FIG. 14 is a schematic view illustrating a planar configuration of a terminal-side frame area FAT of an electronic component board and therearound.

FIG. 14 illustrates a crossing section forming area 362 that is included in the terminal-side frame area FAT. Although not being illustrated in detail, a crossing section 362A where the auxiliary line 369 crosses the source lines 32 generally includes a structure including a line layer of the auxiliary line 369, an insulator formed of oxide or nitride, and a line layer of the source line 32 that are stacked on each other. The auxiliary line 369 is not used if the source line 32 is not disconnected. If the source line 32 is disconnected due to some reason, the crossing section 362A in the terminal-side frame area FAT where the disconnected source line 32 and the auxiliary line 369 cross and a crossing section (not illustrated) in the opposite terminal side frame area FA are irradiated with laser beam, for example. Thus, the insulator that is disposed between the line layer of the auxiliary line 369 and the line layer of the source line 32 is broken and each of the line layers is melted such that the line layers are electrically connected. Accordingly, the disconnected line 32 recovers so that an electric signal can be transmitted through the disconnected line 32. In the electronic component board 330 of the third embodiment, similar to the electronic component board 30 of the first embodiment, the source lines 32 whose total number is N are arranged at the certain line pitch PP within the matrix area MA and the column control terminals 52 are arranged at the certain arrangement pitch PT along a terminal-side edge 330T.

In the third embodiment, as illustrated in FIG. 14, the crossing sections 362A are arranged in the crossing section forming area 362 that extends longitudinally along the terminal side MAT illustrated in FIG. 13 (along the X-axis direction). The crossing section 362A includes first crossing sections 362A1 and second crossing sections 362A2. The first crossing sections 362A1 have a relatively large X-dimension and a relatively small Y-dimension and the second crossing sections 362A2 have a relatively small X-dimension and a relatively large Y-dimension. Each of the crossing sections 362A is a section to be melted by irradiation of a laser beam and needs to have a certain area or greater. Each of the crossing sections 362A is a capacitance section where the auxiliary line 369 crosses the source line 32. Therefore, capacitances are preferably equal with considering driving of the source lines 32. Each area of the crossing sections 362A that are provided for the respective source lines 32 is preferably not varied greatly. Therefore, the X-dimensions and the Y-dimensions of the crossing sections are inversely proportional and have a qualitative relation. In the third embodiment, as illustrated in FIG. 15, an X-dimension of the first crossing section 362A1 is X1 that is same as the X-dimension of the first circuit 62A1 of the first embodiment and a Y-dimension thereof is Y1. An X-dimension of the second crossing section 362A2 is X2 that is same as the X-dimension of the second circuit 62A2 of the first embodiment and a Y-axis dimension thereof is Y2. All of the crossing sections 362A are arranged along the X-axis direction without having a space therebetween. The first crossing sections 362A1 are arranged at the arrangement pitch PC1 that is equal to the X-dimension of the first crossing section 362A1 (PC1=X1) and the second crossing sections 362A2 are arranged at the arrangement pitch PC2 that is equal to the X-dimension of the second crossing section 362A2 (PC2=X2).

Figure 15:
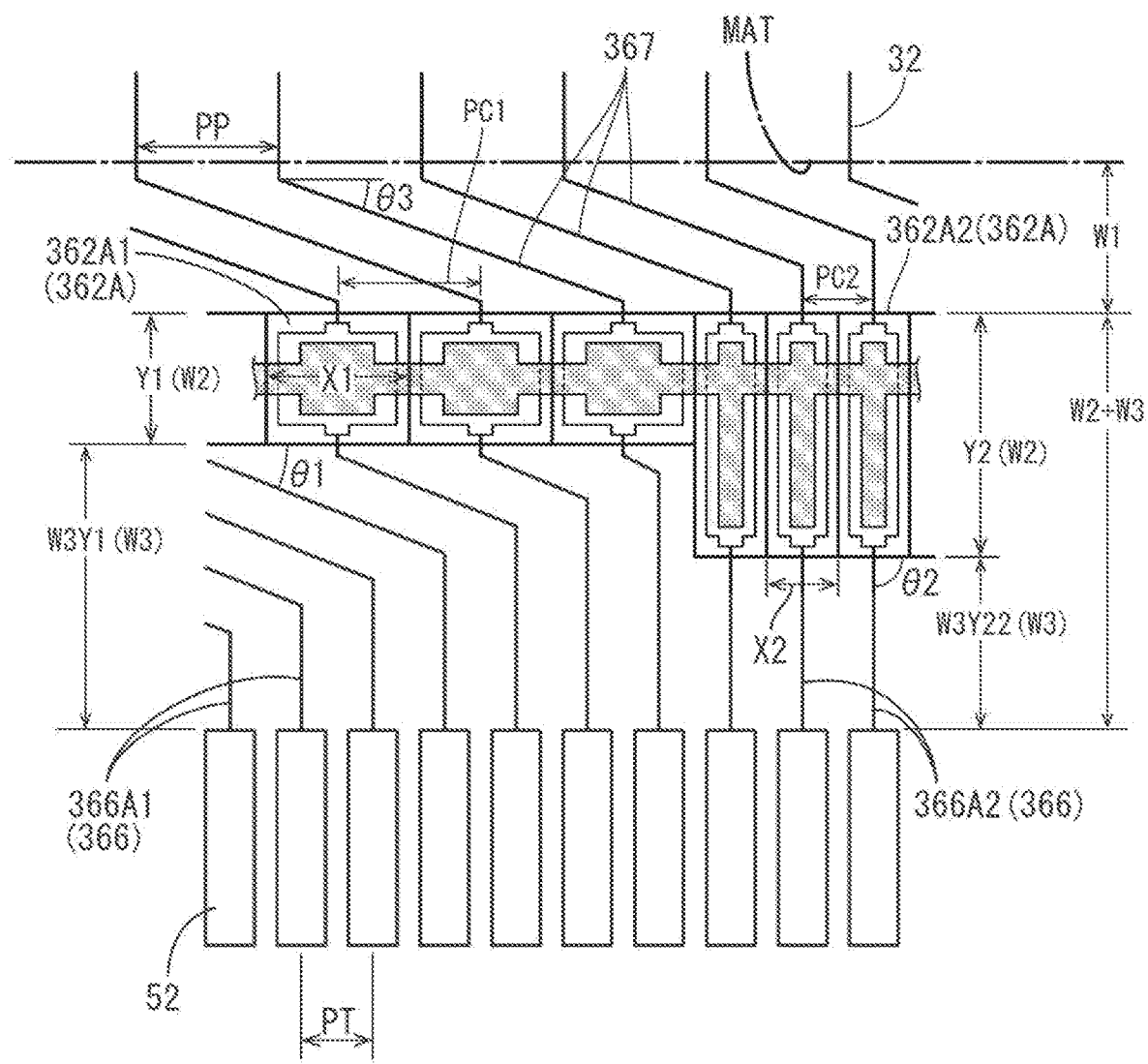
FIG. 15 is a partially enlarged view of an area C in FIG. 14.

As illustrated in FIG. 15, the column connection inner lines 367 and the column connection outer lines 366 that includes the first outer lines 366A1 and the second outer lines 366A2 are routed similarly to the column connection inner lines 67 and the column connection outer lines 66 that includes the first outer lines 66A1 and the second outer lines 66A2 of the first embodiment. Namely, the Y-dimension of the routing area of the column connection inner lines 367 is equal to the Y-dimension W1 of the routing area in the first embodiment, the Y-dimension of the crossing section forming area 362 is equal to the Y-dimension W2 of the column control circuit 62, and the Y-dimension of the routing area of the column connection outer lines 366 is equal to the Y-dimension W3 of the routing area in the first embodiment. Thus, in the third embodiment, similar to the first embodiment, the first outer lines 366A1 and the second outer lines 366A2 that connect the column control terminals 52 to the first crossing sections 362A1 and the second crossing sections 362A, which have different X-dimensions and different Y-dimensions, are routed in different forms intentionally.

In the third embodiment also, the frame width W7 of the terminal-side frame area FAT is defined by the Y-dimension W1 of the routing area of the column connection inner lines 367, the Y-dimension W2 of the crossing section forming area 362, and the Y-dimension W3 of the routing area of the column connection outer lines 366. Such dimensions are components related to the circuits and the connection lines. The frame width WT is substantially defined by the Y-dimensions of the routing areas of the first crossing sections 362A1 and the first outer lines 366A1, that is (Y1+W3Y1). Since the Y-dimension Y1 of the first crossing section 362A1 is set small the frame width WT can be reduced.

As described earlier, in the electronic component board 330 in the liquid crystal panel 310 of the third embodiment, the first crossing section (the first circuit) 362A1 and the second crossing section (the second circuit) 362A2 are the crossing sections (the intersections) 362A where the auxiliary lines 369 and the source lines 32 cross. The auxiliary lines 369 are used as the detour lines if the source line (the signal line) 32 is disconnected.

According to the configuration of the third embodiment, the crossing sections (the intersections) 362A where the auxiliary lines 369 and the source lines 32 cross can be arranged efficiently. The auxiliary lines 369 are provided for preventing operation errors in the matrix area (the signal line area) MA that are to be caused by the disconnection of the source line 32.

Fourth Embodiment

A fourth embodiment will be described with reference to FIGS. 16 and 17. In an electronic component board 430 in the fourth embodiment, a column control circuit 462 includes the test circuits 62A similar to the first embodiment. The test circuits 62A include the first circuits 62A1 and the second circuits 62A2 having different dimensions. The fourth embodiment differs from the first embodiment in that a circuit deformation area LS is included between the first circuit 62A1 and the second circuit 62A2 that are adjacent to each other.

Figure 16:
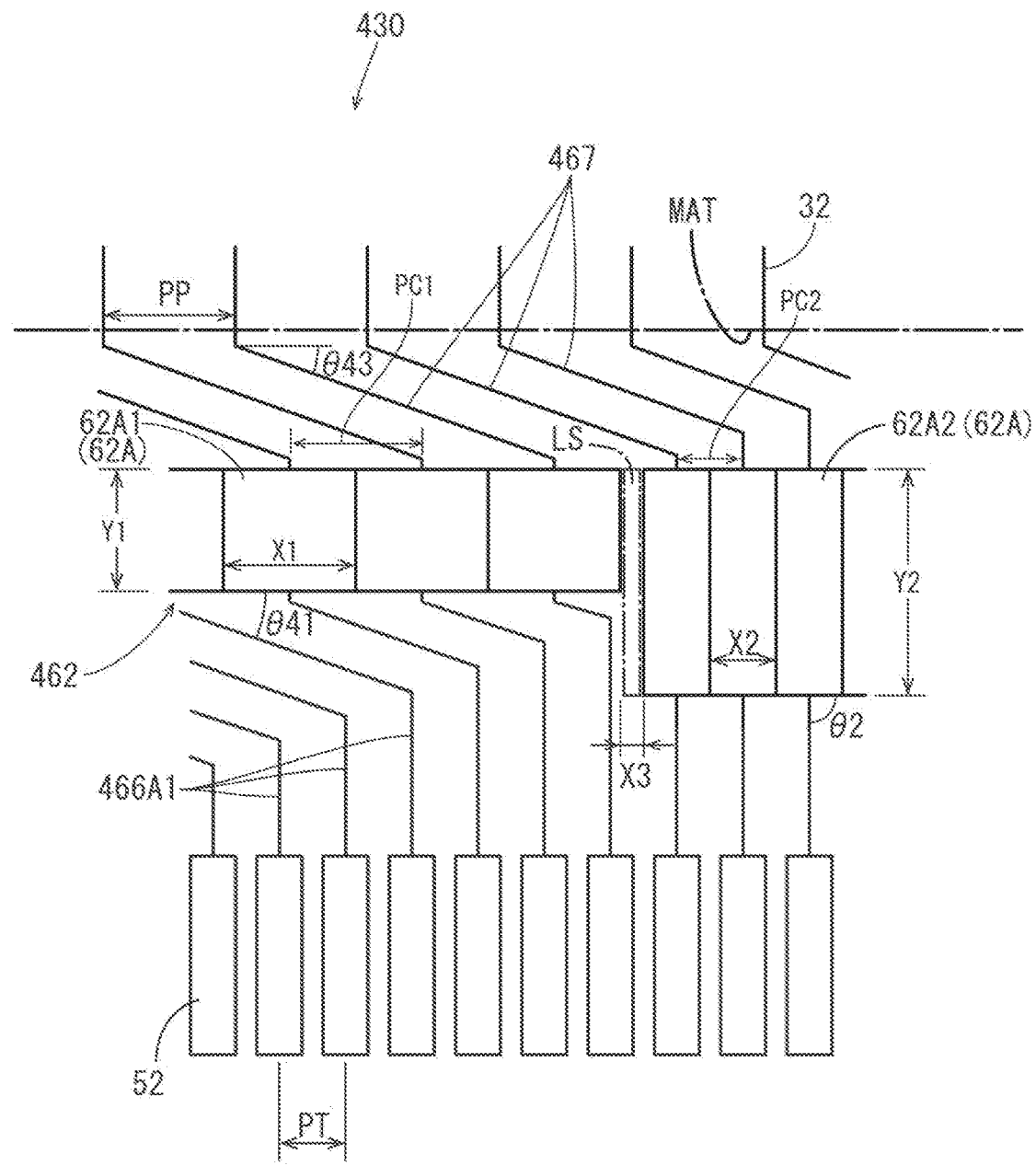
FIG. 16 is a partially enlarged view illustrating a connection structure of terminals, a circuit, and source lines according to a fourth embodiment.

As illustrated in FIG. 16, the electronic component board 430 of the fourth embodiment basically includes the same configuration as that of the electronic component board 30 of the first embodiment. The column control circuit 462 has an elongated form extending along the terminal-side edge. The test circuits 62A are arranged along the X-axis direction in the column control circuit 462. The test circuits 62A in the fourth embodiment includes the first circuits 62A1 having the X dimension X1 and the Y-dimension Y1 same as those of the first embodiment and the second circuits 62A2 having the X-dimension X2 and the Y-dimension Y2 same as those of the first embodiment. The first circuits 62A1 are arranged without having any space therebetween and the arrangement pitch PC1 of the first circuits 62A1 is equal to the X-dimension X1. The second circuits 62A2 are arranged without having any space therebetween and the arrangement pitch. PC2 of the second circuits 62A2 is equal to the X-dimension X2. The circuit deformation area LS having a X-dimension X3 is disposed between the first circuit 62A1 and the second circuit 62A2 that are adjacent to each other.

Figure 17:
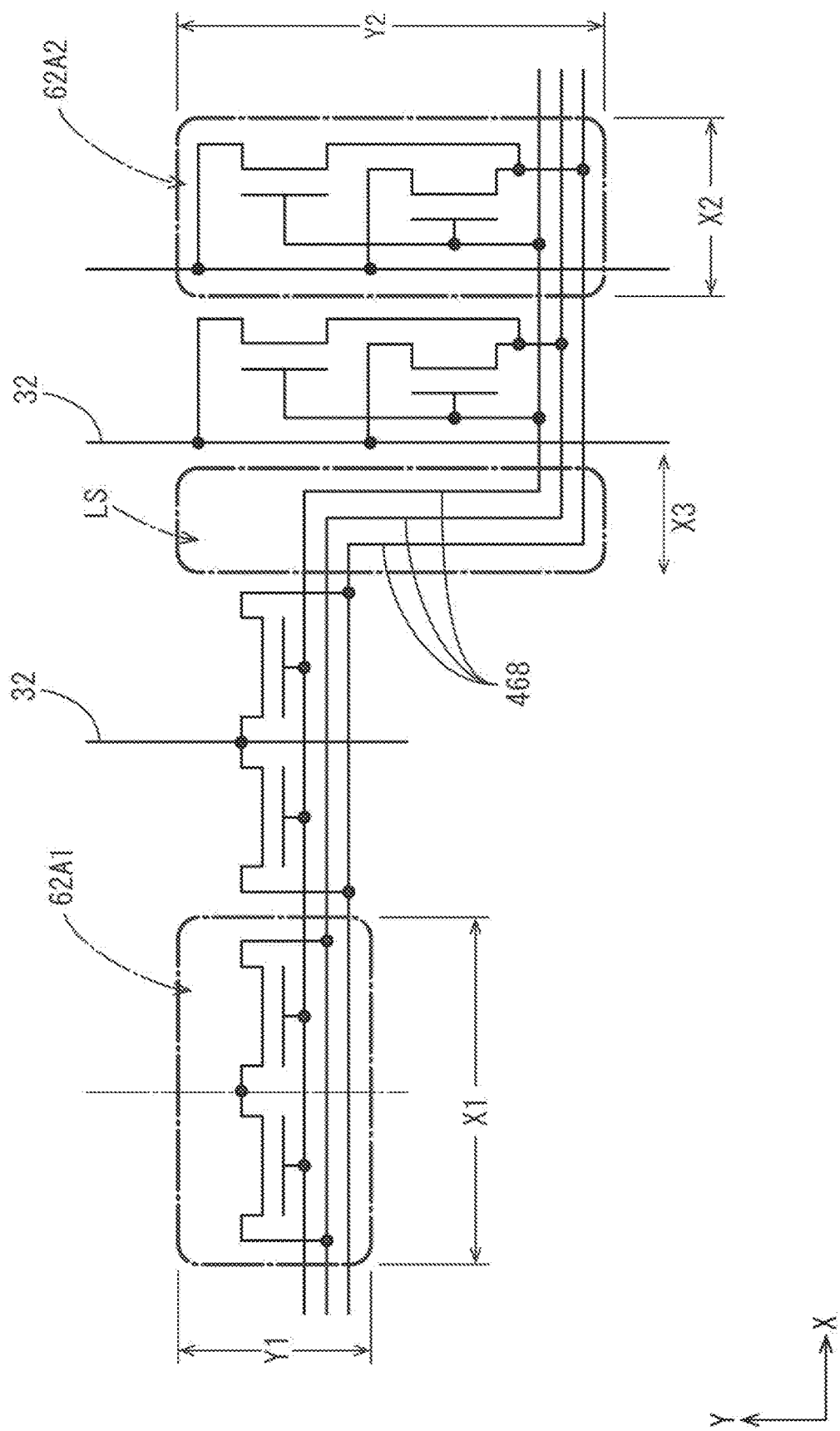
FIG. 17 is a circuit diagram illustrating configurations of a first circuit, a second circuit and a circuit deformation area LS that is disposed between the first circuit and the second circuit.

As illustrated with the circuit diagram in FIG. 17, three test connection lines 468, for example, are provided commonly for the first circuit 62A1 and the second circuit 62A2. Since the Y-dimension Y1 of the first circuit 62A1 differs from the Y-dimension Y2 of the second circuit 62A2, a line path may be necessarily deformed. In such a case, as illustrated in FIG. 17, the first circuit 62A1 and the second circuit 62A2 that are adjacent to each other are spaced from each other by a space X3 so that the circuit deformation area LS for deforming the line path can be provided. Since each of the test connection lines 468 is much thinner than the first circuit 62A1 and the second circuit 62A2, a small area is enough for deforming the lines and the X-dimension X3 of the circuit deformation area LS can be made much smaller than the X-dimension X1 and the X-dimension X2 (X3<<X1, X3<<X2). Inner lines 467 connect the test circuits 62A and the source lines 32 and include inclined portions that are inclined at an inclination angle θ43 with respect to the X-axis direction. The inclination angle θ43 can be maintained close to the angle θ3 in the first embodiment (θ43≈θ3). First outer lines 466A1 connect the first circuits 62A1 and the column control terminals 52 and include inclined portions that are inclined at an inclination angle θ41 with respect to the X-axis direction. The inclination angle θ41 can be also maintained close to the angle θ1 in the first embodiment (θ41≈θ1). Even with the configuration including the circuit deformation area LS in the array of the test circuits 62A, the layout of the circuits and the connection lines is less likely to be influenced by such a configuration and the operations and effects similar to those of the first embodiment can be obtained. The circuit deformation area LS can be additionally included in the second embodiment and the third embodiment in addition to the first embodiment.

As described earlier, the electronic component board 430 of the fourth embodiment includes the circuit deformation area LS between the first circuit 62A1 and the second circuit 62A2 that are adjacent to each other and where the Y-dimension of the test circuit 62A changes. According to such a configuration, the test connection lines 468 that are commonly provided for the first circuits 62A1 and the second circuits 62A2 can be routed while being bent according to the Y-dimension of each circuit.

Other Embodiments

The present technology is not limited to the embodiments, which have been described using the foregoing descriptions and the drawings. For example, embodiments described below are also included in the technical scope of the present technology.

Figure 18A:
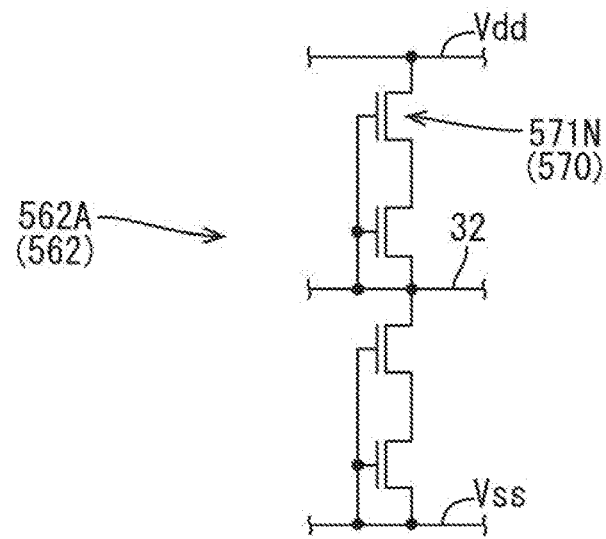
FIG. 18A is a circuit diagram illustrating one example of a protection circuit.
Figure 18B:
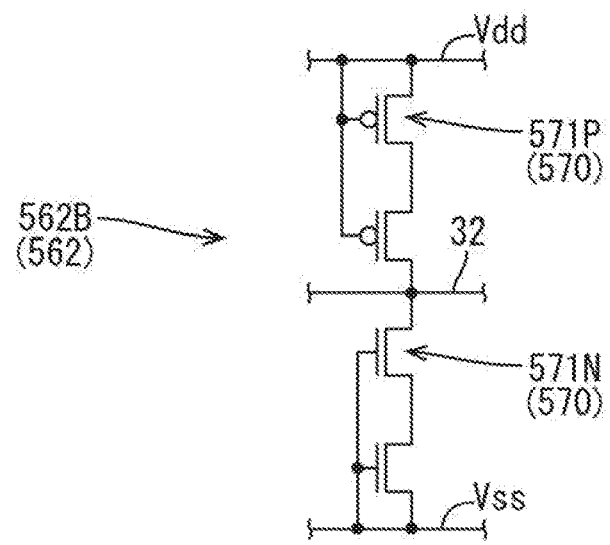
FIG. 18B is a circuit diagram illustrating another example of the protection circuit.
Figure 18C:
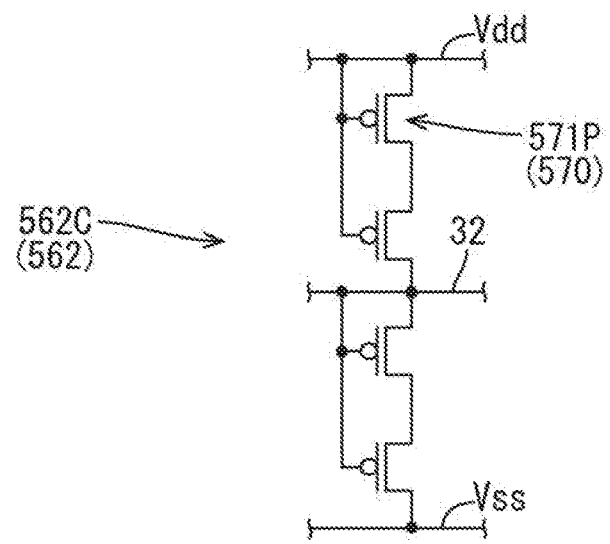
FIG. 18C is a circuit diagram illustrating another example of the protection circuit.

(1) In each of the above embodiments, the circuit corresponds to the test circuit or the cross section where the auxiliary line and the line cross; however, it is not limited thereto. The circuit may not be necessarily related directly to control of the signal lines such as the source lines and the gate lines. For example, the circuit may be a protection circuit that protects the matrix area MA from electrostatic breakdown caused by static electricity entering the electronic component board through the external connection terminal during the electronic component board producing process. The protection circuit may be a circuit including a TFT or a resistance section including a component having higher resistance than the signal line or including winding signal lines. FIG. 18 illustrates examples of the protection circuit 562. Examples of the protection circuits 562 include protection circuits 562A, 562E, 562G. As illustrated in FIG. 18A, the protection circuit 562A includes a high potential power source line Vdd for supplying voltage of a relatively high potential and a low potential power source line Vss for supplying voltage of a relatively low potential. The protection circuit 562A further includes four N-channel type TFTs 571N between the high potential power source line Vdd and the low potential power source line Vss. As illustrated in FIG. 18B, the protection circuit 562B includes two N-channel type TFTs 571N and two P-channel type TFTs 571P between the high potential power source line Vdd and the low potential power source line Vss. As illustrated in FIG. 18C, the protection circuit 562G includes four P-channel type TFTs 571P between the high potential power source line Vdd and the low potential power source line Vss. Any of the protection circuits 562 include the TFTs as circuit components 570. A direction of each TFT and an arrangement direction of the TFTs in the protection circuit 562 are adjusted such that an X-dimension and a Y-dimension of an area used for the protection circuits 562 corresponding to the respective signal lines 32 can be changed as appropriate. Therefore, the present technology can be applied to the electronic component board so as to include first protection circuits and second protection circuits whose dimensions in an arrangement direction and a perpendicular direction are adjusted as appropriate as the protection circuits 562. Accordingly, the protection circuits 562 and the connection lines connecting the protection circuits 562 and the signal lines 32 are effectively arranged on the electronic component board and a frame width of a display panel can be reduced.

(2) In each of the above embodiments, the present technology is applied to the circuits and the connection lines related to control of the source line (the column lines); however, it is not limited thereto. For example, the present technology may be applied to circuits and connection lines related to control of the gate liens (the row lines). The number or the layout of the connection lines are not necessarily configured in a linearly symmetric pattern.

(3) In each of the above embodiments, the present technology is applied to the circuits and the lines that are connected to the signal line (the source lines) related to the image display; however, it is not limited thereto. The signal lines may not necessarily be arranged in a matrix in the signal line area. The present technology can be applied to circuits and lines related to driving other than image display on a display panel. For example, the present technology may be applied to arrangement of circuits and lines related to touch sensing of a display panel. Specifically, an electronic component board, which is an active matrix board including TFTs, includes a common electrode for pixels and the common electrode is divided into multiple electrodes for touch sensing. In such an electronic component board, the present technology can be applied to circuits and lines that are connected to signal lines extended from the divided common electrodes.

(4) In each of the above embodiments, each circuit (a unit circuit) includes two TFTs as the circuit component; however, it is not limited thereto. The number of circuit components included in each circuit is not necessarily same. For example, the first circuit may include multiple circuit components and the second circuit may include the smaller number of circuit components than the first circuit and vice versa.

(5) Each of the circuits (unit circuit) may include components other than the electric circuit components. For example, the first circuit may include numbering symbols and the second circuit may not include numbering symbols and vice versa. Namely, the circuit in this specification may widely include a portion of the matrix board having a certain area provided for each signal line, and the portion includes electrodes and thin films included in the matrix board.

(6) In each of the above embodiments, the matrix area MA (the signal line area) has a square shape; however, it is not limited thereto. The signal line area may have various planar shapes such as a circle, an oval, a polygon, or an irregular shape. When a portion of an outline of the matrix area MA is defined with a straight line, the circuits may be arranged along the straight portion. When a portion or a whole of an outline of the matrix area MA is defined with a curved line, the circuits may be arranged along the curved portion. When arranging the circuits along the curved portion, the circuits may be arranged in a curved form substantially parallel to the curved portion, which is a portion of the outline of the signal line area, or arranged in a substantially straight line as a whole extending in a direction along the curved portion.

(7) In each of the above embodiments, the transmissive-type liquid crystal panel that includes a backlight unit and operates in a VA mode is described; however, it is not limited thereto. An image display mechanism and an operation mode of the liquid crystal panel is not particularly limited. The present technology may be applied to a reflection type liquid crystal panel or a transflective type liquid crystal panel, or liquid crystal panels that operate in various modes. Furthermore, the present technology is not necessarily applied to the electronic component board of the liquid crystal panel but may be applied to electronic component boards included in other types of display panels (e.g., organic EL panels, plasma display panels (PDPs), electrophoretic display panels (EPD), and micro electro mechanical system (MEMS) display panels).

(8) The present technology may be applied to electronic component boards that are used for various other uses in addition to the electronic component board that is used for a display panel.

The invention claimed is:

1. An electronic component board comprising:
   a signal line area where signal lines extend; and
   a frame area surrounding the signal line area, wherein
   in the frame area, terminals through which an external signal is input to the signal lines, connection lines connecting the signal lines and the terminals, and circuits are disposed, and the circuits are disposed between the signal line area and the terminals and arranged on line paths of the connection lines and arranged along a portion of an outline of the signal line area,
   the connection lines are routed such that an entire outline thereof is formed in a fan shape so as to be narrowed from the signal lines toward the terminals,
   the circuits include a first circuit and a second circuit,
   the first circuit has an arrangement dimension in an arrangement direction of the circuits greater than that of the second circuit, and has a perpendicular dimension in a perpendicular direction perpendicular to the arrangement direction smaller than that of the second circuit, and
   wherein the first circuit and the second circuit are crossing sections of the signal lines and an auxiliary line that is used as a detour line when the signal lines are disconnected.

2. The electronic component board according to claim 1, wherein
   the first circuits and one of the terminals that are connected with one of the connection lines are disposed with a displacement in the arrangement direction that is greater than a displacement of the second circuit and another one of the terminals that are connected with another one of the connection lines, and
   the one connection line connecting the one terminal and the first circuit is inclined at an angle θ1 with respect to the arrangement direction and the other connection line connecting the other terminal and the second circuit is inclined at an angle θ2 with respect to the arrangement direction and the angle θ1 and the angle θ2 satisfy |tan θ1|<|tan θ2|.

3. The electronic component board according to claim 1, wherein
   the first circuit includes a first circuit component and the second circuit includes a second circuit component, and
   the first circuit component differs from the second circuit component in at least one of a shape, a direction, a number, and an arrangement direction if multiple circuit components are included.

4. The electronic component board according to claim 1, wherein
   the signal lines include column lines or row lines, the column lines and the row lines are arranged in a matrix,
   pixel electrodes are disposed corresponding to intersections of the column lines and the row lines in the signal line area, and
   the signal line area displays an image.

5. A display panel comprising the electronic component board according to claim 1.

6. An electronic component board comprising:
   a signal line area where signal lines extend; and
   a frame area surrounding the signal line area, wherein
   in the frame area, terminals through which an external signal is input to the signal lines, connection lines connecting the signal lines and the terminals, and circuits are disposed, and the circuits are disposed between the signal line area and the terminals and arranged on line paths of the connection lines and arranged along a portion of an outline of the signal line area,
   the connection lines are routed such that an entire outline thereof is formed in a fan shape so as to be narrowed from the signal lines toward the terminals,
   the circuits include a first circuit and a second circuit,
   the first circuit has an arrangement dimension in an arrangement direction of the circuits greater than that of the second circuit, and has a perpendicular dimension in a perpendicular direction perpendicular to the arrangement direction smaller than that of the second circuit,
   a circuit deformation area is present between the first circuit and the second circuit, and
   the first circuit and the second circuit are crossing sections of the signal lines and an auxiliary line that is used as a detour line when the signal lines are disconnected.

7. The electronic component board according to claim 6, wherein
   the first circuits and one of the terminals that are connected with one of the connection lines are disposed with a displacement in the arrangement direction that is greater than a displacement of the second circuit and another one of the terminals that are connected with another one of the connection lines, and
   the one connection line connecting the one terminal and the first circuit is inclined at an angle θ1 with respect to the arrangement direction and the other connection line connecting the other terminal and the second circuit is inclined at an angle θ2 with respect to the arrangement direction and the angle θ1 and the angle θ2 satisfy |tan θ1|<|tan θ2|.

8. The electronic component board according to claim 6, wherein
   the first circuit includes a first circuit component and the second circuit includes a second circuit component, and the first circuit component differs from the second circuit component in at least one of a shape, a direction, a number, and an arrangement direction if multiple circuit components are included.

9. The electronic component board according to claim 6, wherein the first circuit and the second circuit are test circuits that supply a test signal to the signal lines.

10. The electronic component board according to claim 6, wherein the first circuit and the second circuit are protection circuits.

11. The electronic component board according to claim 6, wherein
- the signal lines include column lines or row lines, the column lines and the row lines are arranged in a matrix,
- pixel electrodes are disposed corresponding to intersections of the column lines and the row lines in the signal line area, and
- the signal line area displays an image.

12. A display panel comprising the electronic component board according to claim 6.

13. The electronic component board according to claim 6, wherein the first circuit and the second circuit are connected via a circuit connection line and the circuit connection line is curved in the circuit deformation area.

* * * * *